(12) United States Patent
Koga et al.

(10) Patent No.: US 11,184,051 B2
(45) Date of Patent: Nov. 23, 2021

(54) COMMUNICATION DEVICE AND COMMUNICATION SIGNAL GENERATION METHOD

(71) Applicant: Panasonic Intellectual Property Management Co., Ltd., Osaka (JP)

(72) Inventors: Hisao Koga, Fukuoka (JP); Makoto Yonekura, Fukuoka (JP); Koji Ikeda, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/985,146

(22) Filed: Aug. 4, 2020

(65) Prior Publication Data

US 2020/0366336 A1 Nov. 19, 2020

Related U.S. Application Data

(63) Continuation of application No. PCT/JP2019/007151, filed on Feb. 25, 2019.

(30) Foreign Application Priority Data

Feb. 26, 2018 (JP) .............................. JP2018-032591

(51) Int. Cl.
*H04B 3/54* (2006.01)

(52) U.S. Cl.
CPC .............. *H04B 3/542* (2013.01); *H04B 3/544* (2013.01); *H04B 3/548* (2013.01)

(58) Field of Classification Search
CPC .......... H04B 3/54; H04B 3/542; H04B 3/544; H04B 3/548; H04J 1/00
See application file for complete search history.

(56) References Cited

U.S. PATENT DOCUMENTS

2010/0002755 A1    1/2010  Heidari et al.
2011/0032015 A1*   2/2011  Bai ...................... H04L 7/0008
                                                        327/162

(Continued)

FOREIGN PATENT DOCUMENTS

JP    2007-19640 A    1/2007
JP    2017-69627 A    4/2017
WO    2016/084297 A1  6/2016

OTHER PUBLICATIONS

IEEE Communications Society, "IEEE Standard for Broadband over Power Line Networks: Medium Access Control and Physical Layer Specifications," IEEE Std 1901™-2010, IEEE Standards Association, New York, USA, Dec. 30, 2010, 1586 pages.

(Continued)

*Primary Examiner* — David B Lugo
(74) *Attorney, Agent, or Firm* — Seed IP Law Group LLP

(57) ABSTRACT

A communication device and a communication signal generation method that perform, adaptively, a wired power line communication that is given desired communication characteristics being in such a level as to satisfy user demands is provided. The communication device includes a selection unit a selection unit which selects a mode that prescribes a number of one or more channels prepared in a prescribed frequency band used for a communication to be performed with another communication device via a wired medium and a channel to be used for the communication in the mode; and a signal processing unit which generates communication frames to be used for the communication by performing signal processing on input data according to the selected mode and channel.

20 Claims, 20 Drawing Sheets

(56) References Cited

U.S. PATENT DOCUMENTS

| | | | |
|---|---|---|---|
| 2012/0051407 A1* | 3/2012 | Ji | H03H 17/0294 375/219 |
| 2013/0101055 A1 | 4/2013 | Pande et al. | |
| 2014/0328416 A1* | 11/2014 | Katar | H04L 45/123 375/257 |
| 2016/0149689 A1 | 5/2016 | Koga et al. | |
| 2016/0149740 A1 | 5/2016 | Koga et al. | |

OTHER PUBLICATIONS

International Search Report, dated Apr. 16, 2019, for International Application No. PCT/JP2019/007151, 5 pages. (With English translation).
Extended European Search Report dated Jan. 27, 2021, for the corresponding European Patent Application No. 19757066.6, 10 pages.

* cited by examiner

*FIG. 4A*

| CLOCK | f1 | f2 | fc1 | fc2 | fr1 | fr2 |
|---|---|---|---|---|---|---|
| 1 FOLD | 2 | 28 | fc11 | fc21 | fr11 | fr21 |
| 2 FOLD | 2 | 56 | fc12 | fc22 | fr12 | fr22 |
| 4 FOLD | 2 | 112 | fc13 | fc23 | fr13 | fr23 |

TBL1

*FIG. 4B*

|     | 1/2(CH1) | 1/2(CH2) | 1/4(CH1) | 1/4(CH2) | 1/4(CH3) | 1/4(CH4) |
|-----|----------|----------|----------|----------|----------|----------|
| fc1 | 2(=f1)   | 17       | 2(=f1)   | 9        | 17       | 24       |
| fc2 | 14       | 28(=f2)  | 7        | 14       | 22       | 28(=f2)  |
| fr1 | 4        | 2.75     | 8        | 4.75     | 5.5      | 2.25     |
| fr2 | 28       | 24.75    | 28       | 24.75    | 25.5     | 18.25    |

TBL2

FIG. 4C

|  | 1/2(CH1) | 1/2(CH2) | 1/4(CH1) | 1/4(CH2) | 1/4(CH3) | 1/4(CH4) |
|---|---|---|---|---|---|---|
| fc1 | 2(=f1) | 34 | 2(=f1) | 17 | 34 | 48 |
| fc2 | 28 | 56(=f2) | 14 | 28 | 44 | 56(=f2) |
| fr1 | 4 | 5.5 | 8 | 5.5 | 11 | 4.5 |
| fr2 | 56 | 49.5 | 56 | 49.5 | 51 | 36.5 |

TBL3

FIG. 4D

| | 1/2(CH1) | 1/2(CH2) | 1/4(CH1) | 1/4(CH2) | 1/4(CH3) | 1/4(CH4) |
|---|---|---|---|---|---|---|
| fc1 | 2(=f1) | 68 | 2(=f1) | 34 | 68 | 96 |
| fc2 | 56 | 112(=f2) | 28 | 56 | 88 | 112(=f2) |
| fr1 | 4 | 11 | 8 | 11 | 22 | 9 |
| fr2 | 112 | 99 | 112 | 99 | 102 | 73 |

TBL4

COMMUNICATION DEVICE AND COMMUNICATION SIGNAL GENERATION METHOD

CROSS-REFERENCE TO RELATED APPLICATIONS

This application is a continuation of PCT International Patent Application No. PCT/JP2019/007151 filed on Feb. 25, 2019, which claims the benefit of priority of Japanese Patent Application No. 2018-032591 filed on Feb. 26, 2018, the entire contents of which are incorporated herein by reference.

TECHNICAL FIELD

The present invention relates to a communication device and a communication signal generation method for generating a communication signal of wired power line communication.

BACKGROUND ART

Among the conventional standard techniques of IEEE (The Institute of Electrical and Electronics Engineers) 1901 which is a communication standard relating to power line communication (e.g., high-speed power line communication), wired communication using Wavelet OFDM (orthogonal frequency division multiplexing) is known (e.g., refer to Non-patent document 1). This wired communication uses a single communication channel (hereinafter referred to as simply as a "channel") having a frequency band (i.e., a frequency band of 2 MHz to 30 MHz) that can be used in high-speed power line communication.

CITATION LIST

Non-Patent Literature

[NPL 1] IEEE Communications Society, "IEEE Standard for Broadband over Power Like Networks: Medium Access Control and Physical Layer Specifications," IEEE Std 1901-2010, 30 Dec. 2010.

SUMMARY OF INVENTION

Technical Problem

However, there is a problem that with the use of only the above-mentioned single channel desired communication characteristics may not be obtained fully to such an extent as to satisfy user demands being affected by an attenuation characteristic of a communication signal or a noise characteristic depending on a situation of a wired transmission line between an electronic device (hereinafter also referred to as a "PLC device") capable of accommodating the above-mentioned power line communication (PLC) and another PLC device as a communication counterpart.

The concept of the present disclosure has been conceived in view of the above circumstances, and the disclosure provide a communication device and a communication signal generation method that perform, adaptively, a wired power line communication that is given desired communication characteristics being in such a level as to satisfy user demands.

Solution to Problem

The present disclosure provides a communication device comprising a selection unit which selects a mode that prescribes the number of one or more channels prepared in a prescribed frequency band and to be used for a communication to be performed with another communication device over a wired medium and a channel to be used for the communication in the mode; and a signal processing unit which generates communication frames to be used for the communication by performing signal processing on input data according to the selected mode and channel.

The disclosure also provides a communication signal generation method of a communication device, comprising the steps of selecting a mode that prescribes the number of one or more channels prepared in a prescribed frequency band and to be used for a communication to be performed with another communication device over a wired medium and a channel to be used for the communication in the mode; and generating communication frames to be used for the communication by performing signal processing on input data according to the selected mode and channel.

Advantageous Effects of Invention

The disclosure makes it possible to perform, adaptively, a wired power line communication that is given desired communication characteristics being in such a level as to satisfy user demands.

BRIEF DESCRIPTION OF DRAWINGS

FIG. 4A is a table showing examples of a usable frequency range (f1 to f2), a frequency band of each channel (fc1 to fc2), and a frequency range (fr1 to fr2) of sampling data.

FIG. 4B is a table showing examples of fc1, fc2, fr1, and fr2 corresponding to each of a case of a 1-fold clock frequency and a ½ mode and a case of the 1-fold clock frequency and a ¼ mode.

FIG. 4C is a table showing examples of fc1, fc2, fr1, and fr2 corresponding to each of a case of a 2-fold clock frequency and the ½ mode and a case of the 2-fold clock frequency and the ¼ mode.

FIG. 4D is a table showing examples of fc1, fc2, fr1, and fr2 corresponding to each of a case of a 4-fold clock frequency and the ¼ mode and a case of the 4-fold clock frequency and the ¼ mode.

DESCRIPTION OF EMBODIMENT

Figure 1:
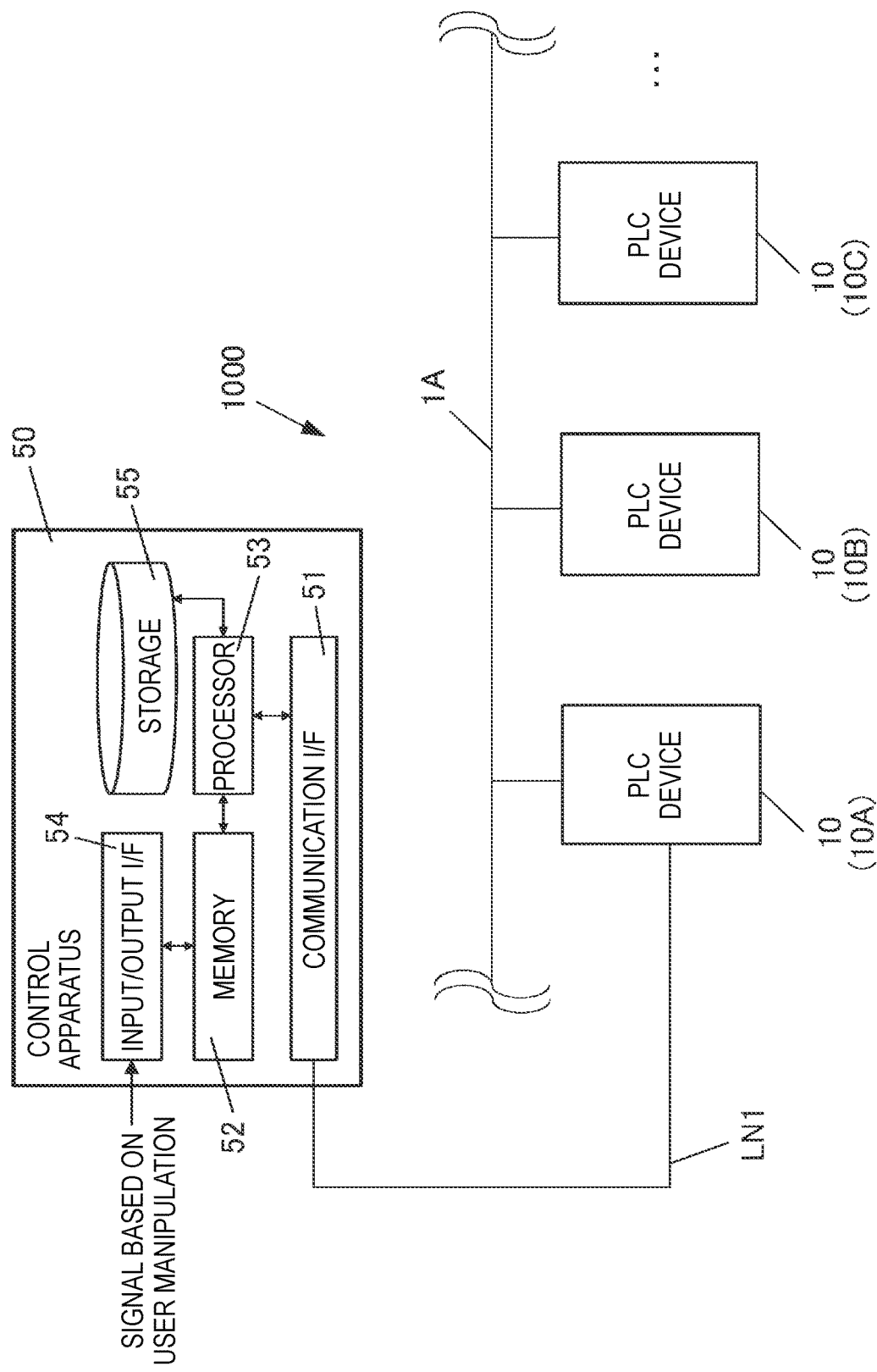
FIG. 1 is a block diagram showing an example configuration of a wired communication system according to a first embodiment.

An embodiment of a communication device and a communication signal generation method according to the present disclosure will be disclosed in a specific manner will be described in detail by referring to the drawings when necessary. However, unnecessarily detailed descriptions may be avoided. For example, detailed descriptions of already well-known items and duplicated descriptions of constituent elements having substantially the same ones already described may be omitted. This is to prevent the following description from becoming unnecessarily redundant and thereby facilitate understanding of those skilled in the art. The following description and the accompanying drawings are provided to allow those skilled in the art to understand the disclosure thoroughly and are not intended to restrict the subject matter set forth in the claims.

FIG. 1 is a block diagram showing an example configuration of a wired communication system 1000 according to a first embodiment. For example, the wired communication system 1000 is configured so as to include three PLC (power line communication) devices 10A, 10B, and 10C and a control apparatus 50. In the wired communication system 1000, the number of PLC devices 10 installed, each of which is an example of a term "communication device," is not limited to three.

The control apparatus 50 is connected, by a communication cable LN1, to a PLC device 10 (e.g., PLC device 10A) having a role of a parent device of power line communication among the three PLC device s 10A, 10B, and 10C and can perform a wired communication (e.g., LAN (local area network) communication) with the parent PLC device 10. On the other hand, in the wired communication system 1000 shown in FIG. 1, the control apparatus 50 is not connected, by the communication cable LN1, to the PLC devices 10 (e.g., PLC devices 10B and 10C) each having a role of a child device of power line communication among the three PLC devices 10A, 10B, and 10C and hence cannot perform a wired communication (mentioned above) communication) with the child PLC devices 10. Like the parent device, the PLC devices 10 (e.g., PLC devices 10B and 10C) that function as child devices may be connected to the control apparatus 50 by the communication cable LN1. Alternatively, the control apparatus 50 may communicate with all or part of the three PLC devices 10A, 10B, and 10C by wireless communication.

In the wired communication system 1000, plural PLC devices 10 are connected to a wired medium (e.g., power line 1A) so as to be able to perform a power line communication. For example, in FIG. 1, each of the three PLC devices 10A, 10B, and 10C can perform a power line communication with another PLC device (an example of a term "another communication device"). The PLC devices 10A, 10B, and 10C are the same in internal configuration as described later in detail with reference to FIG. 2. In the following description, the PLC devices 10A, 10B, and 10C will be referred to generically as "PLC devices 10" in the case where they are not discriminated from each other particularly in operation (processing). The PLC devices 10 can perform a power line communication according to, for example, the communication standard of IEEE (The Institute of Electrical and Electronics Engineers) 1901.

For example, each PLC device 10 is a PLC modem or an electric apparatus that incorporates a PLC modem. Such an electric apparatus may include any of a home electrical appliance such as a TV receiver, a telephone, a video deck, or a set-top box or an office appliance such as a personal computer (PC), a facsimile machine or a printer. Alternatively, each PLC device 10 may include an infrastructure apparatus such as an interphone, a door auto-lock system, a smart meter, an intra-building energy managing system, an intra-factory energy managing system, or a demand-response-compatible apparatus or an IoT (Internet of Things) apparatus such as a smart street light, a security camera (in other words, surveillance camera), an air-conditioning control apparatus, an illumination control apparatus, or a sensor device.

Thus, assumed as example uses of each PLC device 10 according to the first embodiment are a use in which high-speed power line communication is necessary to satisfy the need of a user (e.g., customer) of the PLC device 10, a use in which power line communication capable of long-distance communication is necessary, and a use in which both of them are necessary. Each PLC device 10 according to the first embodiment can perform power line communication capable of accommodating any of the above uses and can realize wired communication that satisfies user needs, is comfortable to use, and is high in scalability.

As described later in detail, the control apparatus 50 determines a communication channel (hereinafter referred to simply as a "channel") to be used when each PLC device 10 will perform a power line communication. The control apparatus 50 is configured using a personal computer (PC), for example, and data that is based on a signal sent from a mouse or a keyboard capable of receiving a user manipulation can be input to it. The control apparatus 50 is configured so as to include a communication interface 51, a memory 52, a processor 53, an input/output interface 54, and a storage 55.

The communication interface 51 is configured using a communication circuit that performs a wired communication with the PLC device 10A which is the PLC parent device and transmits and receives data or information to and from the PLC device 10A. In FIG. 1, the communication interface 51 is abbreviated as a "communication I/F" to simplify the expression.

The memory 52 is configured using a RAM (random access memory) and a ROM (read-only memory), for example, and holds programs and data that are necessary for operation of the control apparatus 50 and, furthermore, temporarily holds data or information generated during an operation of the control apparatus 50. The RAM is a work memory that is used, for example, during operation of the control apparatus 50. The ROM stores in advance and holds, for example, programs and data to be used for controlling the control apparatus 50. The ROM holds a program having an algorithm for determining a channel to be used by a PLC device 10 (described later) in performing a power line communication (in other words, a program written according to such an algorithm is determined).

The processor 53 is configured using a CPU (central processing unit), an MPU (microprocessing unit), a DSP (digital signal processor), or an FPGA (field programmable gate array). Functioning as a controller for controlling the operation of the control apparatus 50, the processor 53 performs control processing for supervising the operations of the individual units of the control apparatus 50 in a centralized manner, data input/output processing with the individual units of the control apparatus 50, data computation (calculation) processing, and data storage processing. The processor 53 operates according to the programs and data stored in the memory 52. The processor 53 uses the memory 52 during its operation and may store data or information generated or acquired by the processor 53 in the memory 52 temporarily.

The input/output interface 54 receives data that is based on a signal sent from the above-mentioned mouse or keyboard capable of receiving a user manipulation and outputs data held in the memory 52 to an external apparatus (not shown) that is connected to the control apparatus 50. In FIG. 1, the input/output interface 54 is abbreviated as an "input/output I/F" to simplify the expression.

The storage 55 is configured using a semiconductor memory such as a flash memory, an HDD (hard disk drive), or an SSD (solid-state drive) and records data or information generated or acquired by the processor 53. The details of the operation of the control apparatus 50 will be described later with reference to FIGS. 14A, 14B, and 14C.

Figure 2:
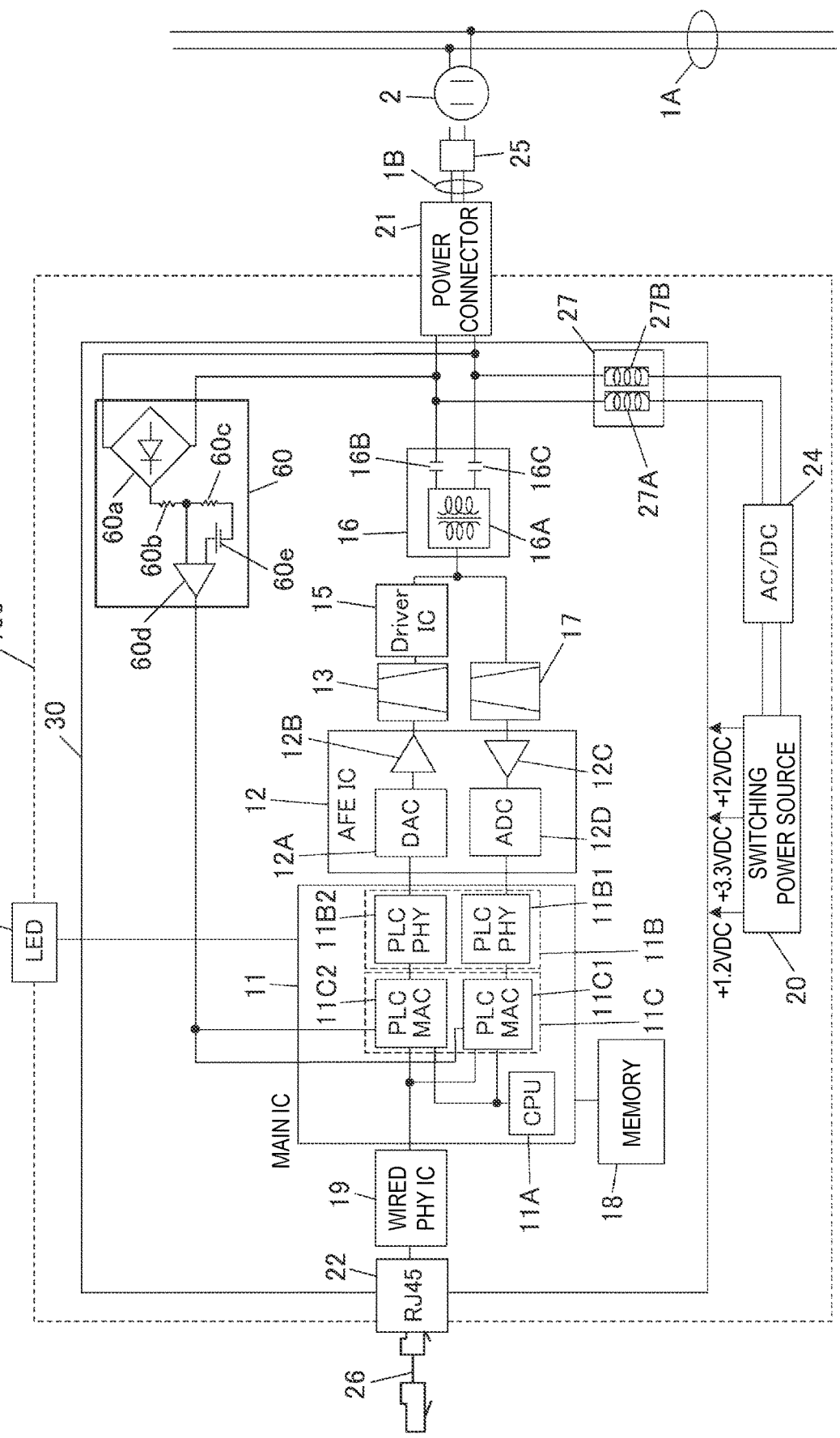
FIG. 2 is a block diagram showing an example hardware configuration of each PLC device according to the first embodiment.

FIG. 2 is a block diagram showing an example hardware configuration of each PLC device 10 according to the first embodiment. The PLC device 10 is configured so as to include a switching power source 20 and a circuit module 30.

The switching power source 20 supplies various loads in the circuit module 30 with DC voltages (e.g., +1.2 V, +3.3 V, and +12 V) that are suitable as drive power source for the respective loads. For example, the switching power source 20 includes a switching transformer (not shown) and a DC-DC converter (not shown). Power to the switching power source 20 is supplied from a power connector 21 via an impedance upper 27 and an AC-DC converter 24. In FIG. 2, the AC-DC converter 24 is abbreviated as "AC/DC" to simplify the expression. For example, the power connector 21 is provided on a back surface of a body 100 of the PLC device 10.

The circuit module 30 is configured so as to include a main IC (integrated circuit) 11, an AFE IC (analog front end integrated circuit) 12, a lowpass filter (LPF) 13, a driver IC 15, a coupler 16, a bandpass filter (BPF) 17, and a memory 18. The circuit module 30 also includes a wired PHY IC (physical layer integrated circuit) 19 capable of accommodating wired communication of Ethernet (registered trademark) or the like and an AC cycle detector 60.

The coupler 16 is connected to the power connector 21 (an example of a term "first communication unit") and further connected to a power line 1A via a power cable 1B, a power plug 25, and a receptacle 2. An LED (light-emitting diode) 23, which operates as a display unit of the PLC device 10, is connected to the main IC 11. A LAN cable 26 for connection to various apparatus (e.g., a personal computer such as the control apparatus 50) is connected to a modular jack 22 (an example of a term "second communication unit"). For example, the modular jack 22 is provided on the back surface of the body 100. For example, the LED 23 is provided on a front surface of the body 100.

The main IC 11 (an example of the term "communication device") includes a CPU 11A, PLC MAC (power line communication•media access control layer) blocks 11C1 and 11C2, and PLC PHY (power line communication•physical layer) blocks 11B1 and 11B2.

For example, the CPU 11A is provided with a 32-bit RISC (reduced instruction set computer)-type processor. The PLC MAC block 11C2 manages a MAC layer (media access control layer) of a transmission signal (e.g., manages execution of selection (determination) of a channel (described later)). The PLC MAC block 11C1 manages a MAC layer of a reception signal. The PLC PHY block 11B2 manages a PHY layer (physical layer) of a transmission signal (e.g., manages execution of multiplication of a clock signal (described later) and resampling). The PLC PHY block 11B1 manages a PHY layer (physical layer) of a reception signal.

The AFE IC 12 includes a DA converter (DAC: digital-to-analog converter) 12A, an AD converter (ADC: analog-to-digital converter) 12D, and variable gain amplifiers (VGAs) 12B and 12C.

The coupler 16 includes a coil transformer 16A and coupling capacitors 16B and 16C. The CPU 11A controls the operations of the PLC MAC blocks 11C1 and 11C2 and the PLC PHY blocks 11B1 and 11B2 and controls the entire PLC device 10 while referring to data or information stored in the memory 18.

In the example of FIG. 2, the PLC device 10 has the PLC MAC block 11C1 and the PLC PHY block 11B1 as reception blocks and, furthermore, has the PLC MAC block 11C2 and the PLC PHY block 11B2 as transmission blocks. Instead, the PLC device 10 may include a PLC MAC block 11C and a PLC PHY block 11B that serve for both of transmission and reception (indicated by broken lines in FIG. 2).

The PLC MAC blocks 11C1 and 11C2 may be referred to together as a PLC MAC block 11C and the PLC PHY blocks 11B1 and 11B2 may be referred to together as a PLC PHY block 11B.

Like common, known modems, the main IC 11 is an electrical circuit 'LSI: large scale integration) that performs signal processing including, for example, basic controls or modulation and demodulation for data communication. For example, the main IC 11 modulates various kinds of digital signal processing (e.g., the resampling among clock frequency multiplication, resampling, and frequency shifting (described later)) and modulation on data that is received from a communication terminal (e.g., PC) via the modular jack 22 and outputs a digital transmission signal (an example of a term "communication frames") generated by the digital signal processing to the AFE IC 12. Furthermore, the main IC 11 demodulates a reception signal by performing digital signal processing on a signal that is received from the power line 1A via the AFE IC 12 and outputs the demodulated reception signal to the communication terminal (e.g., PC) via the modular jack 22.

The AC cycle detector 60 generates a sync signal that is necessary for the PLC devices 10 to operate in synchronism with each other. The AC cycle detector 60 includes a diode bridge 60a, resistors 60b and 60c, a DC (direct current) power supply unit 60e, and a variable gain amplifier 60d.

The diode bridge 60a is connected to the resistor 60b. The resistor 60b is connected to the resistor 60c in series. The connection point between the resistors 60b and 60c are connected to one terminal of the variable gain amplifier 60d. The DC power supply unit 60e is connected to the other terminal of the variable gain amplifier 60d.

More specifically, the AC cycle detector 60 generates a sync signal in the following manner. The AC cycle detector 60 detects zero cross points of an AC power waveform AC (i.e., an AC waveform that is a sinusoidal wave of 50 Hz or 60 Hz) of a commercial power source supplied to the power line 1A and generates a sync signal using the timing of the zero cross points as references. An example sync signal is a rectangular wave consisting of plural pulses that are synchronized with the zero cross points of the AC power waveform. The AC cycle detector 60 may be omitted. In this case, to synchronize operations of the PLC devices 10, for example, a sync signal that is included in a communication signal transmitted from an external device is used.

For example, a power line communication is generally performed by the PLC device 10 in the following manner.

For example, at the time of transmission, data that is input from the modular jack 22 is sent to the main IC 11 via the wired PHY IC 19 which is compatible with Ethernet (registered trademark) and then subjected to digital signal processing (e.g., at least the resampling among clock frequency multiplication, resampling, and frequency shifting (mentioned above)), whereby a digital transmission signal is generated. The generated digital transmission signal is converted into an analog transmission signal by the DA converter 12A of the AFE IC 12. The converted analog transmission signal is output to the power line 1A via the lowpass filter 13, the driver IC 15, the coupler 16, the power connector 21, the power cable 1B, the power plug 25, and the receptacle 2.

For another example, at the time of reception, a reception signal supplied and received from the power line 1A is sent to the bandpass filter 17 via the coupler 16, gain-adjusted by the variable gain amplifier 12C of the AFE IC 12, and then converted into a digital reception signal by the AD converter 12D. The converted digital signal is sent to the main IC 11, where it is converted into digital data by digital signal processing. The converted digital data is output from the modular jack 22 via the wired PHY IC 19 which is compatible with Ethernet (registered trademark).

Next, digital signal processing (e.g., clock frequency multiplication, resampling, and frequency shifting) that is performed by the main IC 11 of the PLC device 10 will be described with reference to FIGS. 3-12.

Figure 3:
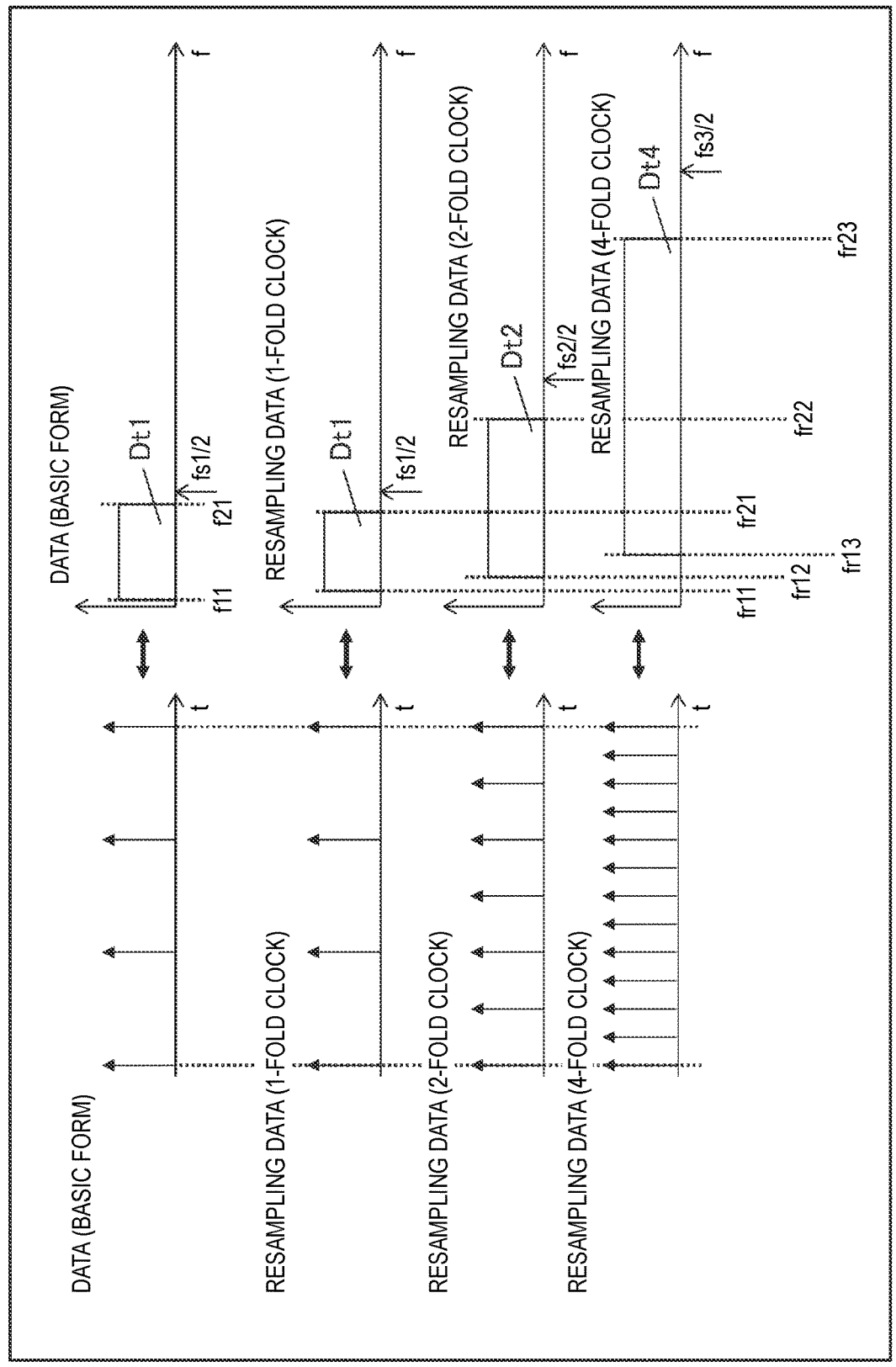
FIG. 3 is an explanatory diagram schematically illustrating examples of how resampling data is distributed on the time axis and the frequency axis when a clock frequency is multiplied.

FIG. 3 is an explanatory diagram schematically illustrating examples of how resampling data is distributed on the time axis and the frequency axis when the clock frequency is multiplied. The PLC device 10 (e.g., PLC device 10A) according to the first embodiment uses a prescribed frequency band (e.g., 2 MHz to 30 MHz) that is prescribed in the communication standard of IEEE 1901 in a wired communication that is performed with another PLC device 10 (e.g., PLC device 10B) over the power line 1A. According to the communication standard of IEEE 1901, the PLC device 10 can perform a power line communication in which a throughput of about 240 Mbps, for example, is obtained by using the frequency band of 2 MHz to 30 MHz as one channel (i.e., as a standard mode).

The PLC device 10 according to the first embodiment can perform a faster power line communication by multiplying the clock frequency (in other words, sampling frequency) used in the above-mentioned standard mode (in other words, the mode in which a 1-fold clock frequency (e.g., 62.5 MHz) is used without multiplying the clock frequency).

To simplify the description, the following description will be made using 2 MHz to 28 MHz as an example frequency range that can be used for a power line communication performed by the PLC device 10. For convenience, the lower limit f1 of the usable frequency range is assumed to be 2 MHz. Likewise, for convenience, the upper limit f2 of the usable frequency range is assumed to be 28 MHz. In the following description, one may read "f2=28 MHz" as "f2=30 MHz."

In FIG. 3, the horizontal axes of four graphs arranged in a vertical row on the left side on the paper surface represent time and the horizontal axes of four graphs arranged in a vertical row on the right side on the paper surface represent the frequency. That is, each of the four graphs arranged in a vertical row on the left side on the paper surface show components on the time axis of data for resampling to be performed by the PLC PHY block 11B2 of the main IC 11 (hereinafter referred to as "resampling data"). Likewise, each of the four graphs arranged in a vertical row on the right side on the paper surface show components on the frequency axis of data for resampling to be performed by the PLC PHY block 11B2 of the main IC 11 (hereinafter referred to as "resampling data").

That is, sets of components, on the time axis and the frequency axis, of resampling data in the case of a 1-fold clock frequency obtained without clock frequency multiplication are shown for comparison on the left side and right side on the paper surface in the second part (from the top) of FIG. 3. Likewise, sets of components, on the time axis and the frequency axis, of resampling data in the case of 2-fold clock frequency multiplication are shown for comparison on the left side and right side on the paper surface in the third part of FIG. 3. Likewise, sets of components, on the time axis and the frequency axis, of resampling data in the case of 4-fold clock frequency multiplication are shown for comparison on the left side and right side on the paper surface in the fourth part (bottom part) of FIG. 3.

As shown in the top part and the second part of FIG. 3, in the case where clock frequency multiplication is not done (i.e., 1-fold clock frequency 62.5 MHz), resampling data Dt1 has components having frequencies f11 (=fr11=2 MHz) to f21 (=fr21=28 MHz). The resampling data Dt1 has frequency components that are lower than the Nyquist frequency (fs1/2), where fs1 is the sampling frequency without clock frequency multiplication and is 62.5 MHz. The frequency fr11 is the lower limit of the frequency components of the resampling data Dt1 without clock frequency multiplication and is 2 MHz, for example. The frequency fr21 is the upper limit of the frequency components of the resampling data Dt1 without clock frequency multiplication and is 28 MHz, for example.

Likewise, as shown in the third part of FIG. 3, in the case where 2-fold clock frequency multiplication is done (i.e., 125 MHz that is two times the clock frequency 62.5 MHz, resampling data Dt2 has components having frequencies fr12 (=2×fr11=4 MHz) to fr22 (=2×fr21=56 MHz). The resampling data Dt2 has frequency components that are lower than the Nyquist frequency (fs2/2), where fs2 is the sampling frequency in the case of 2-fold clock frequency multiplication and is 125 MHz. The frequency fr12 is the lower limit of the frequency components of the resampling data Dt2 in the case of 2-fold clock frequency multiplication and is 4 MHz, for example. The frequency fr22 is the upper limit of the frequency components of the resampling data Dt2 in the case of 2-fold clock frequency multiplication and is 56 MHz, for example. Incidentally, since subcarriers used in power line communication are determined in advance, not only the lower limit frequency of the frequency range but also its upper limit is changed by the 2-fold clock frequency multiplication, like f12 and f22.

Likewise, as shown in the bottom part of FIG. 3, in the case where 4-fold clock frequency multiplication is done (i.e., 250 MHz that is four times the clock frequency 62.5 MHz), resampling data Dt4 has components having frequencies fr13 (=4×fr11=8 MHz) to fr23 (=4×fr21=112 MHz). The resampling data Dt3 has frequency components that are lower than the Nyquist frequency (fs3/2), where fs3 is the sampling frequency in the case of 4-fold clock frequency multiplication and is 250 MHz. The frequency fr13 is the lower limit of the frequency components of the resampling data Dt4 in the case of 4-fold clock frequency multiplication and is 8 MHz, for example. The frequency fr23 is the upper limit of the frequency components of the resampling data Dt4 in the case of 4-fold clock frequency multiplication and is 112 MHz, for example. Likewise, since subcarriers used in power line communication are determined in advance, not only the lower limit frequency of the frequency range but also its upper limit is changed by the 4-fold clock frequency multiplication, like f13 and f23.

FIG. 4A is a table showing examples of a usable frequency range (f1 to f2), a frequency band of each channel (fc1 to fc2), and a frequency range (fr1 to fr2) of sampling data. FIG. 4B is a table showing examples of fc1, fc2, fr1, and fr2 corresponding to each of a case of the 1-fold clock frequency and a ½ mode and a case of the 1-fold clock frequency and a ¼ mode. FIG. 4C is a table showing examples of fc1, fc2, fr1, and fr2 corresponding to each of a case of the 2-fold clock frequency and the ½ mode and a case of the 2-fold clock frequency and the ¼ mode. FIG. 4D is a table showing examples of fc1, fc2, fr1, and fr2 corresponding to each of a case of the 4-fold clock frequency and the ½ mode and a case of the 4-fold clock frequency and the ¼ mode.

The tables TBL1, TBL2, TBL3, and TBL4 shown in FIGS. 4A, 4B, 4C, and 4D, respectively, may be held in the memory 18, for example. As shown in FIG. 4A, where clock frequency multiplication is not done, the frequency range that can be used in power line communication is f1 (=2 MHz) to f2 (=28 MHz), the lower limit and the upper limit of a frequency band of a channel are represented by fc11 and fc21, respectively, and the lower limit and the upper limit of the frequency range of resampling data are represented by fr11 and fr21, respectively.

Where 2-fold clock frequency multiplication is done, the frequency range that can be used in power line communication is f1 (=2 MHz) to f2 (=56 MHz), the lower limit and the upper limit of a frequency band of a channel are represented by fc12 and fc22, respectively, and the lower limit and the upper limit of the frequency range of resampling data are represented by fr12 and fr22, respectively.

Where 4-fold clock frequency multiplication is done, the frequency range that can be used in power line communication is f1 (=2 MHz) to f2 (=112 MHz), the lower limit and the upper limit of a frequency band of a channel are represented by fc13 and fc23, respectively, and the lower limit and the upper limit of the frequency range of resampling data are represented by fr13 and fr23, respectively.

As shown in FIG. 4B, in the case where clock frequency multiplication is not done and the mode is a mode (½ mode or ¼ mode) for power line communication capable of accommodating a long-distance communication, the lower limit and the upper limit of a frequency band of each channel in each mode and the lower limit and the upper limit of a frequency range of resampling data can be calculated according to Equation (1) and Equation (2) (described later). These calculations are performed by the PLC PHY block 11B2, for example. Calculation results of those limits may be held in a table TBL2 shown in FIG. 4B. In Equation (1) and Equation (2), fs1 is equal to 62.5 MHz. In Equation (1) to Equation (6), X is a numerical value indicating a mode and Y is a number (ordinary number) indicating a channel. For example, for a first channel CH1 of two channels that are formed in the ½ mode, X and Y are equal to "2" and "1," respectively.

In the following description, the ½ mode is a mode in which two channels are formed in the frequency range f1 to f2 that can be used in power line communication to make the communication distance of the power line communication longer than in the standard mode (e.g., to increase the communication distance by a factor of 1.5 from the standard mode). Likewise, the ¼ mode is a mode in which four channels are formed in the frequency range f1 to f2 that can be used in power line communication to make the communication distance of the power line communication longer than in the standard mode (e.g., to increase the communication distance by a factor of 2 from the standard mode).

[Formula 1]

$$fc11 = \frac{fr11}{X} + \frac{\left(\frac{fs1}{2}\right)}{X} * (Y-1) \quad (1)$$

[Formula 2]

$$fc21 = \frac{fr21}{X} + \frac{\left(\frac{fs1}{2}\right)}{X} * (Y-1) \quad (2)$$

As shown in FIG. 4C, in the case where clock frequency multiplication (2 fold) is done and the mode is a mode (½ mode or ¼ mode) for power line communication capable of accommodating a long-distance communication, the lower limit and the upper limit of a frequency band of each channel in each mode and the lower limit and the upper limit of a frequency range of resampling data can be calculated according to Equation (3) and Equation (4) (described later). These calculations are performed by the PLC PHY block 11B2, for example. Calculation results of those limits may be held in a table TBL3 shown in FIG. 4C. In Equation (3) and Equation (4), fs2 is equal to 125 (=2×62.5) MHz.

[Formula 3]

$$fc12 = \frac{fr12}{X} + \frac{\left(\frac{fs2}{2}\right)}{X} * (Y-1) \quad (3)$$

[Formula 4]

$$fc22 = \frac{fr22}{X} + \frac{\left(\frac{fs2}{2}\right)}{X} * (Y-1) \quad (4)$$

As shown in FIG. 4D, in the case where clock frequency multiplication (4 fold) is done and the mode is a mode (½ mode or ¼ mode) for power line communication capable of accommodating a long-distance communication, the lower limit and the upper limit of a frequency band of each channel in each mode and the lower limit and the upper limit of a frequency range of resampling data can be calculated according to Equation (5) and Equation (6) (described later). These calculations are performed by the PLC PHY block 11B2, for example. Calculation results of those limits may be held in a table TBL4 shown in FIG. 4D. In Equation (5) and Equation (6), fs3 is equal to 250 (=4×62.5) MHz.

[Formula 5]

$$fc13 = \frac{fr13}{X} + \frac{\left(\frac{fs3}{2}\right)}{X} * (Y-1) \quad (5)$$

[Formula 6]

$$fc13 = \frac{fr23}{X} + \frac{\left(\frac{fs3}{2}\right)}{X} * (Y-1) \quad (6)$$

Figure 5:
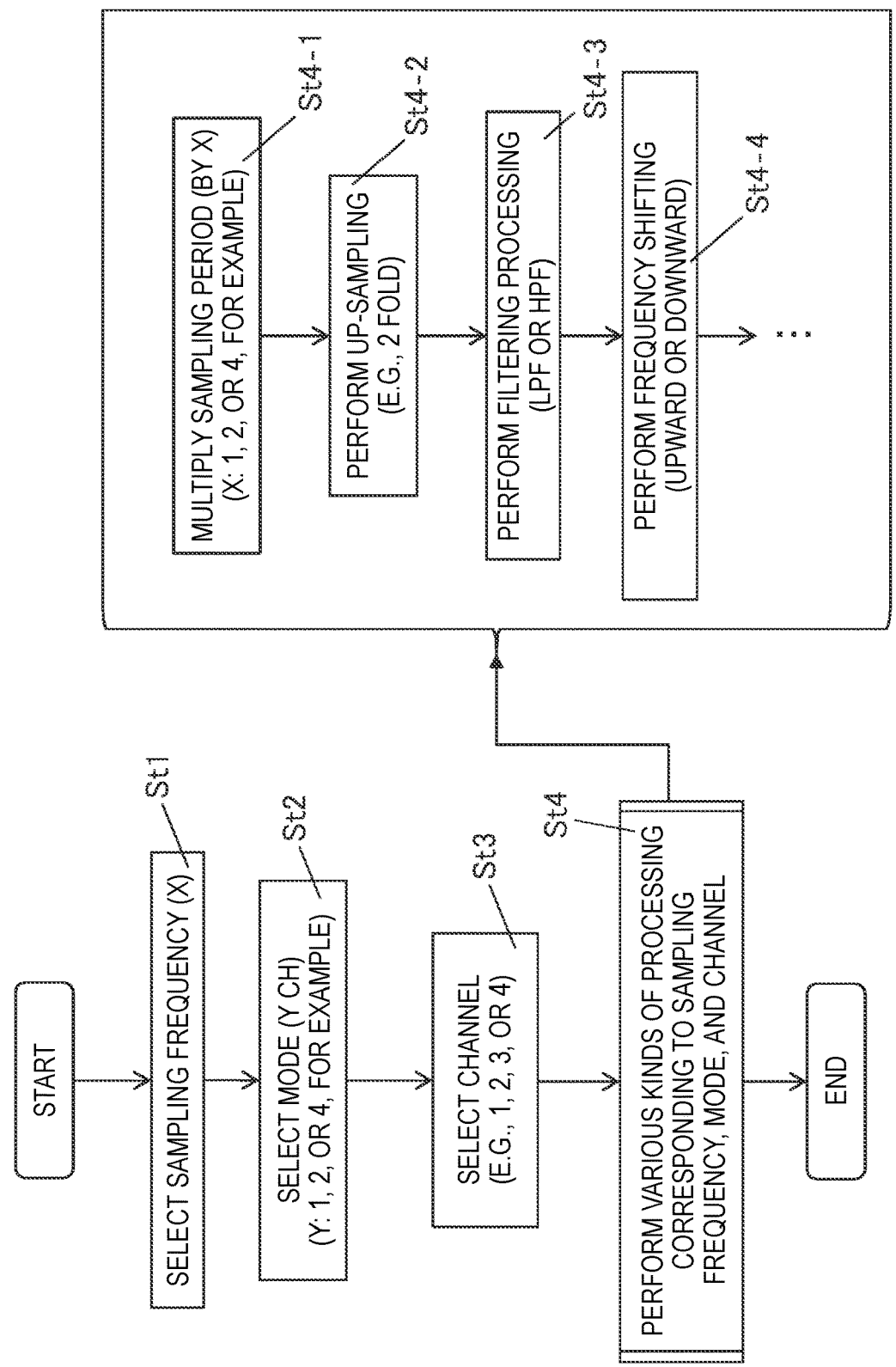
FIG. 5 is a flowchart showing an example operation procedure of digital signal processing performed by each PLC device according to the first embodiment.

Next, the operation procedure of digital signal processing performed by the PLC device 10 according to the first embodiment will be described with reference to FIG. 5. FIG. 5 is a flowchart showing an example overall operation procedure of the PLC device 10 according to the first embodiment.

Referring to FIG. 5, the PLC device 10 selects a sampling frequency (X fold; X is one of 1, 2, and 4) (St1). That is, by determining a sampling frequency (X fold), the PLC device 10 determines a clock frequency corresponding to the determined sampling frequency. The PLC device 10 performs various kinds of digital signal processing (described later) according to the determined clock frequency. Although X is selected among 1, 2, or 4, there numbers are just examples. At step St1, selection is made by the PLC MAC block 11C2, for example.

As described later in detail, the PLC device 10 selects a mode to be used in a power line communication on the basis of transmission line information transmitted from another PLC communication device, for example (St2). That is, the PLC device 10 determines the number (Y: 1, 2, or 4) of channels to be prepared (i.e., formed) in a frequency range that can be used in the power line communication. Although Y is selected here among 1, 2, and 4, these numbers are just examples. At step St2, the selection is made by the PLC MAC block 11C2, for example.

The PLC device 10 selects a channel (e.g., one of CH1, CH2, CH3, and CH4) to be used in the power line communication with the other PLC device on the basis of the mode (e.g., ¼ mode) selected at step St2 (St3). That is, the PLC device 10 determines by selecting which of the channels that are prepared corresponding to the mode selected at step St2 the power line communication should be performed. At step St3, the selection is made by the PLC MAC block 11C2, for example.

After step St3, the PLC device 10 performs various kinds of digital signal processing according to the mode and the channel selected at step St2 and St3, respectively, using the sampling frequency selected at step St1 (St4). At step St4, the various kinds of digital signal processing are performed by the PLC PHY block 11B2, for example.

More specifically, the PLC device 10 multiplies the sampling frequency (in other words, clock frequency) selected at step St1 and operates according to the multiplied sampling frequency. The PLC device 10 multiplies the sampling period at which to sample multiplied data (i.e., resampling data that has been input to the main IC 11) according to the mode selected at step St2 (St4-1).

The PLC device 10 performs up-sampling (e.g., 2-fold up-sampling) on resampling data as subjected to the sampling period multiplication at step St4-1 according to the mode selected at step St2 (St4-2).

The PLC device 10 performs filtering processing on resampling data as up-sampled at step St4-2 according to the channel selected at step St3 and thereby acquires resampling data having components in the frequency band of the selected channel (St4-3). In the first embodiment, steps St4-2 and St4-3 are together referred to as "resampling."

After executing step St4-3, if necessary, the PLC device 10 performs frequency shifting (in other words, frequency conversion) processing to convert the frequency components of the resampling data acquired at step St4-3 into the frequency band of the selected channel selected at step St3 (St4-4). After executing step St4-4, the PLC device 10 may perform resampling (i.e., the same processing as the processing of steps St4-2 and St4-3) on resampling data as subjected to step St4-4 according to the mode and the channel selected at steps St2 and St3, respectively.

The PLC device 10 can generate communication frames that comply with a prescribed format used for the power line communication by performing the digital signal processing of step St4. Incidentally, for example, each of communication frames used in a power line communication of the PLC device 10 has a structure that includes a preamble, a frame control, and a frame body. Communication frames are formed so as to have a desired arrangement in the time domain and the frequency domain. Data of the preamble have fixed values (e.g., all of them are "1"). For example, the data of the preamble is used for carrier detection, synchronization, and demodulation. Data of the frame control and data of the frame body have indefinite values.

Figure 6:
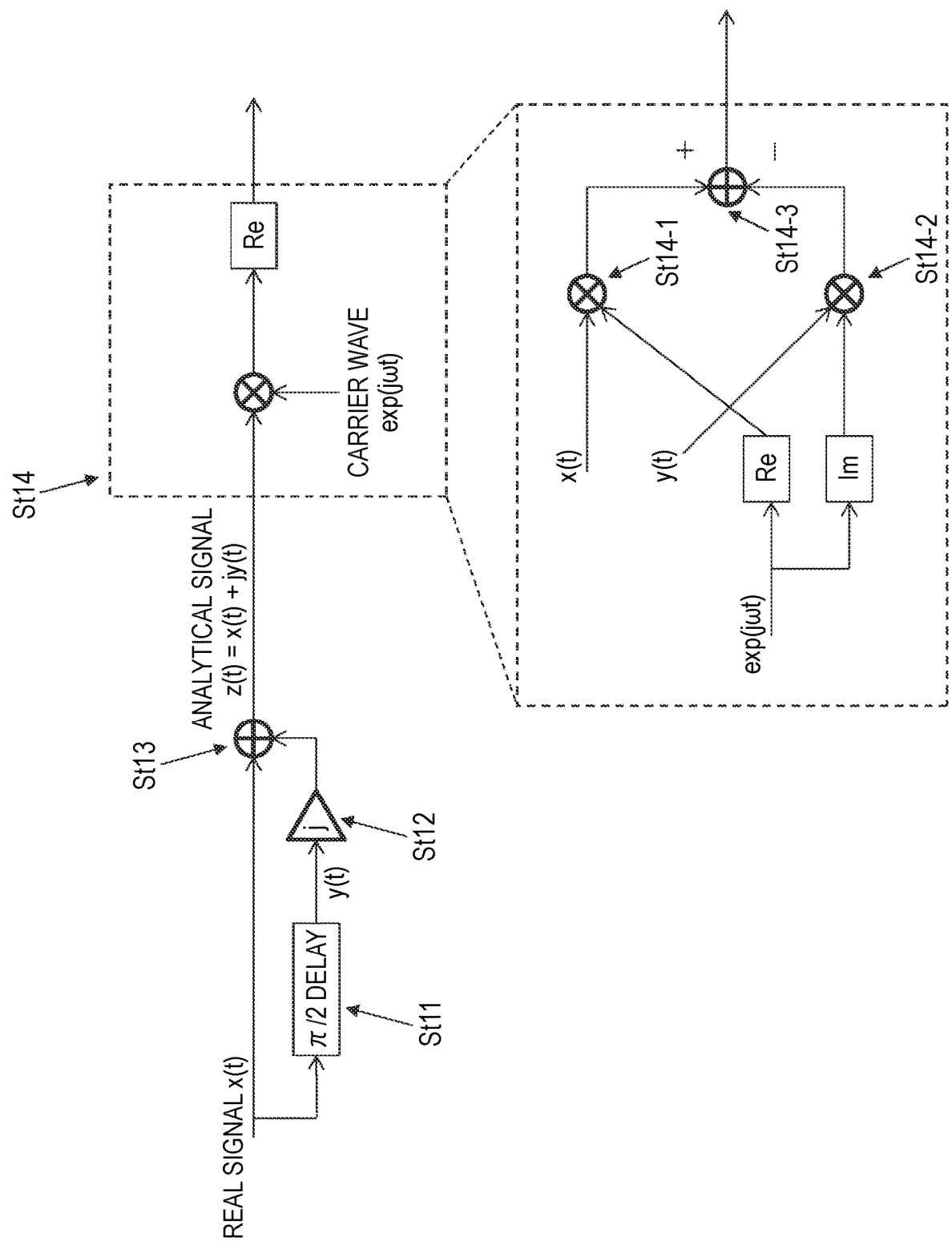
FIG. 6 is an explanatory diagram showing an example method of frequency shifting to be performed on resampling data.

FIG. 6 is an explanatory diagram showing an example method of the frequency shifting to be performed on resampling data. For example, the PLC device 10 according to the first embodiment uses, as the frequency shifting to be performed on resampling data, processing that resampling data is subjected to Hilbert transform (i.e., elimination of negative frequency components) and then multiplied by a carrier wave. The Hilbert transform processing shown in FIG. 6 is performed by the PLC PHY block 11B2, for example.

As shown in FIG. 6, in the Hilbert transform, a signal y(t) is generated by delaying the phase of a real signal x(t) having a real part by $\pi/2$ (St11). The signal y(t) generated at step St11 is multiplied by the complex coefficient j (St12) and a multiplication result signal jy(t) is added to the real signal x(t), whereby a complex signal z(t) is generated (St13). The complex signal z(t) is called an analytic signal and has no negative frequency components.

A real part is extracted from a result of multiplication between the complex signal z(t) generated at step St13 and a carrier wave exp(jωt) (St14). As a result, a real signal is generated that is frequency-shifted resampling data having only a real part. As shown in FIG. 6 in detail, a result (see St14-1) of multiplication between the real signal x(t) and the real part of the carrier wave exp(jωt) and a result (see St14-2) of multiplication between the signal y(t) and the imaginary part of the carrier wave exp(jωt) are added together (St14-3). As a result, a real signal is generated that is frequency-shifted resampling data having only a real part.

Incidentally, the PLC device 10 may generate resampling data in the frequency band of the channel selected at step St3 using another frequency shifting method not using Hilbert transform (see FIG. 6). For example, the PLC device 10 may generate resampling data suitable for the frequency band of the channel selected at step St3 by removing unnecessary frequency components by performing a method that is similar to a method that is used in generating a high-frequency signal in ordinary wireless communication (e.g., a result of multiplication between a baseband signal and a carrier wave is subjected to filtering processing).

Figure 7:
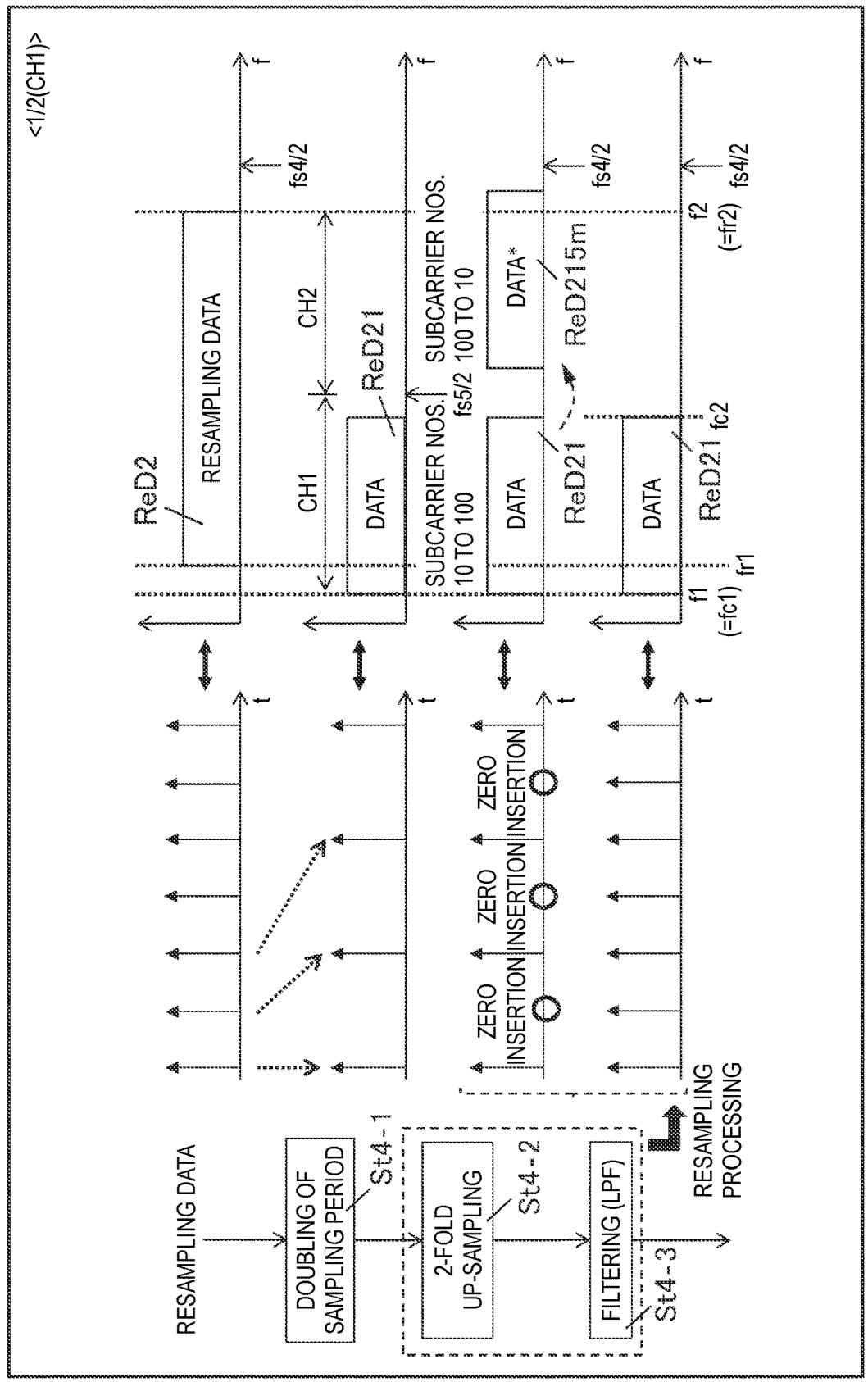
FIG. 7 is an explanatory diagram outlining an example of processing of step St4 corresponding to a case of the ½ mode and a channel CH1.
Figure 8:
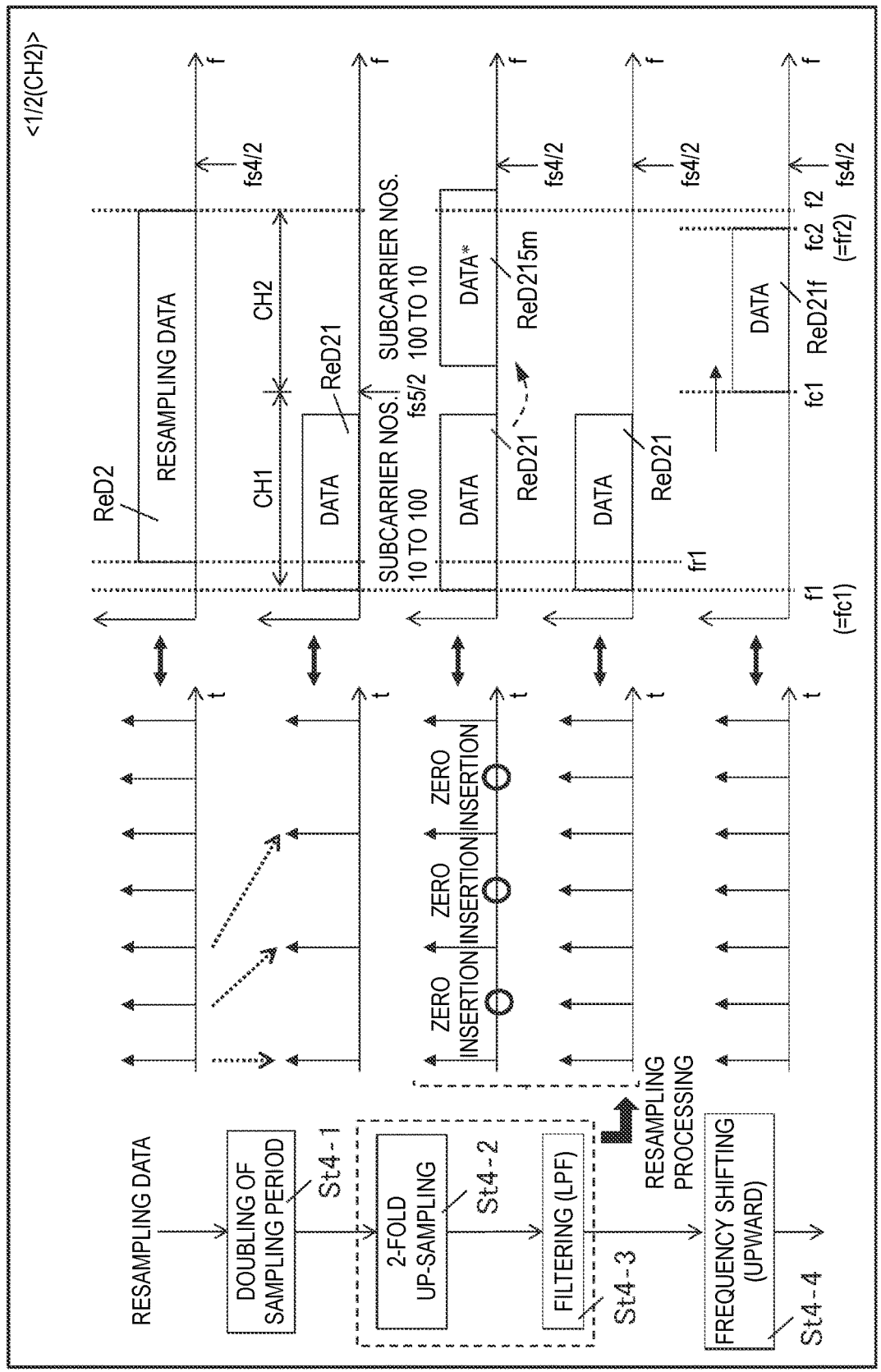
FIG. 8 is an explanatory diagram outlining an example of processing of step St4 corresponding to a case of the ½ mode and a channel CH2.

FIG. 7 is an explanatory diagram outlining an example of processing of step St4 corresponding to the case of the ½ mode and the channel CH1. FIG. 8 is an explanatory diagram outlining an example of processing of step St4 corresponding to the case of the ½ mode and the channel CH2.

In FIGS. 7 and 8, a flowchart shown on the leftmost side on the paper surface is an extracted part of the flowchart shown in FIG. 5. Graphs showing time-axis components of four resampling data are arranged in a vertical row in the middle part on the paper surface in the same manner as in FIG. 3. Graphs showing frequency-axis components of the four resampling data are arranged in a vertical row on the rightmost side on the paper surface in the same manner as in FIG. 3. The two sets of graphs are shown for comparison.

In the example of FIG. 7, clock frequency multiplication is not done and hence the sampling frequency fs4 is equal to 62.5 MHz. For example, where 2-fold clock frequency multiplication is done, the sampling frequency fs4 becomes 62.5 MHz×2=125 MHz. For another example, where 4-fold clock frequency multiplication is done, the sampling frequency fs4 becomes 62.5 MHz×4=250 MHz. The sampling frequencies corresponding to further kinds of clock frequency multiplication are determined in similar manners.

As shown in FIG. 7, when the sampling period is doubled (St4-1), a change is made from resampling data ReD2 in a frequency range (more specifically, fr1 (=4 MHz; see FIG. 4B) to fr2 (=f2=28 MHz)) that is lower than the Nyquist frequency (=fs4/2) to resampling data ReD21 having frequency components of f1 (=2 MHz; see FIG. 4B) to fc2 (=14 MHz; see FIG. 4B). The Nyquist frequency becomes fs5/2. The frequency fs5 (=fs4/2) is equal to 31.25 MHz. For example, the resampling data ReD21 has data corresponding to subcarrier numbers 10 to 100.

After step St4-1, 2-fold up-sampling is performed (St4-2). For example, the PLC PHY block 11B2 performs processing of inserting 0s into the resampling data ReD21. As a result, resampling data ReD215m which is a folded version of the resampling data ReD21 is generated on the opposite side (i.e., high-frequency side) of the Nyquist frequency fs5/2 to the resampling data ReD21. "Datax" in FIGS. 7-12 means folded resampling data. The Nyquist frequency becomes fs4/2. The folded resampling data ReD215m has data obtained by reversing the arrangement of the data, corresponding to the subcarrier numbers 10 to 100, of the resampling data ReD21 in the left-right direction (i.e., data corresponding to the subcarrier numbers 100 to 10).

After step St4-2, filtering processing using a lowpass filter is performed (St4-3). For example, the high-frequency-side folded resampling data ReD215m is cut away by a lowpass filter (not shown) incorporated in the PLC PHY block 11B2. As a result, resampling data ReD21 is generated that is included in the frequency band (fc1 to fc2) of the channel CH1. The Nyquist frequency is kept equal to fs4/2, that is, the one before the start of step St4-1. As a result, by executing steps St4-1, St4-2, and St4-3, the PLC device 10 can generate a digital transmission signal that enables a desired power line communication that satisfies user needs because the PLC device 10 can generate resampling data suitable for the mode and the channel selected at steps St2 and St3, respectively, while satisfying the condition that it should be in a frequency band lower than the Nyquist frequency to be used for the power line communication.

In the example of FIG. 8, clock frequency multiplication is not done and hence the sampling frequency fs4 is equal to 62.5 MHz.

As shown in FIG. 8, when the sampling period is doubled (St4-1), a change is made from resampling data ReD2 in a frequency range (more specifically, fr1 (=4 MHz; see FIG. 4B) to fr2 (=f2=28 MHz)) that is lower than the Nyquist frequency (=fs4/2) to resampling data ReD21 having frequency components of f1 (=2 MHz; see FIG. 4B) to fc2 (=14 MHz; see FIG. 4B). The Nyquist frequency becomes fs5/2. For example, the resampling data ReD21 has data corresponding to subcarrier numbers 10 to 100.

After step St4-1, 2-fold up-sampling is performed (St4-2). For example, the PLC PHY block 11B2 performs processing of inserting 0s into the resampling data ReD21. As a result, resampling data ReD215m which is a folded version of the resampling data ReD21 is generated on the opposite side (i.e., high-frequency side) of the Nyquist frequency fs5/2 to the resampling data ReD21. The Nyquist frequency becomes fs4/2.

After step St4-2, filtering processing using a lowpass filter is performed (St4-3). For example, the high-frequency-side folded resampling data ReD215m is cut away by a lowpass filter (not shown) incorporated in the PLC PHY block 11B2. As a result, resampling data ReD21 is generated that is included in the frequency band (fc1 to fc2) of the channel CH1. The Nyquist frequency is kept equal to fs4/2, that is, the one before the start of step St4-1.

Furthermore, after step St4-3, frequency shifting (frequency conversion) processing as described above with reference to FIG. 6 is performed (St4-4). For example, the PLC PHY block 11B2 generates resampling data ReD21f by frequency-converting frequency components of the resampling data ReD21 so as to obtain a use frequency band fc1 to fc2 of the channel CH2 selected at step St3 by performing calculation according to Equation (1) or Equation (2) or using the table TBL2 shown in FIG. 4B. As a result, by executing steps St4-1, St4-2, St4-3, and St4-4, the PLC device 10 can generate a digital transmission signal that enables a desired power line communication that satisfies user needs because the PLC device 10 can generate resampling data suitable for the mode and the channel selected at steps St2 and St3, respectively, while satisfying the condition that it should be in a frequency band lower than the Nyquist frequency to be used for the power line communication.

Figure 9:
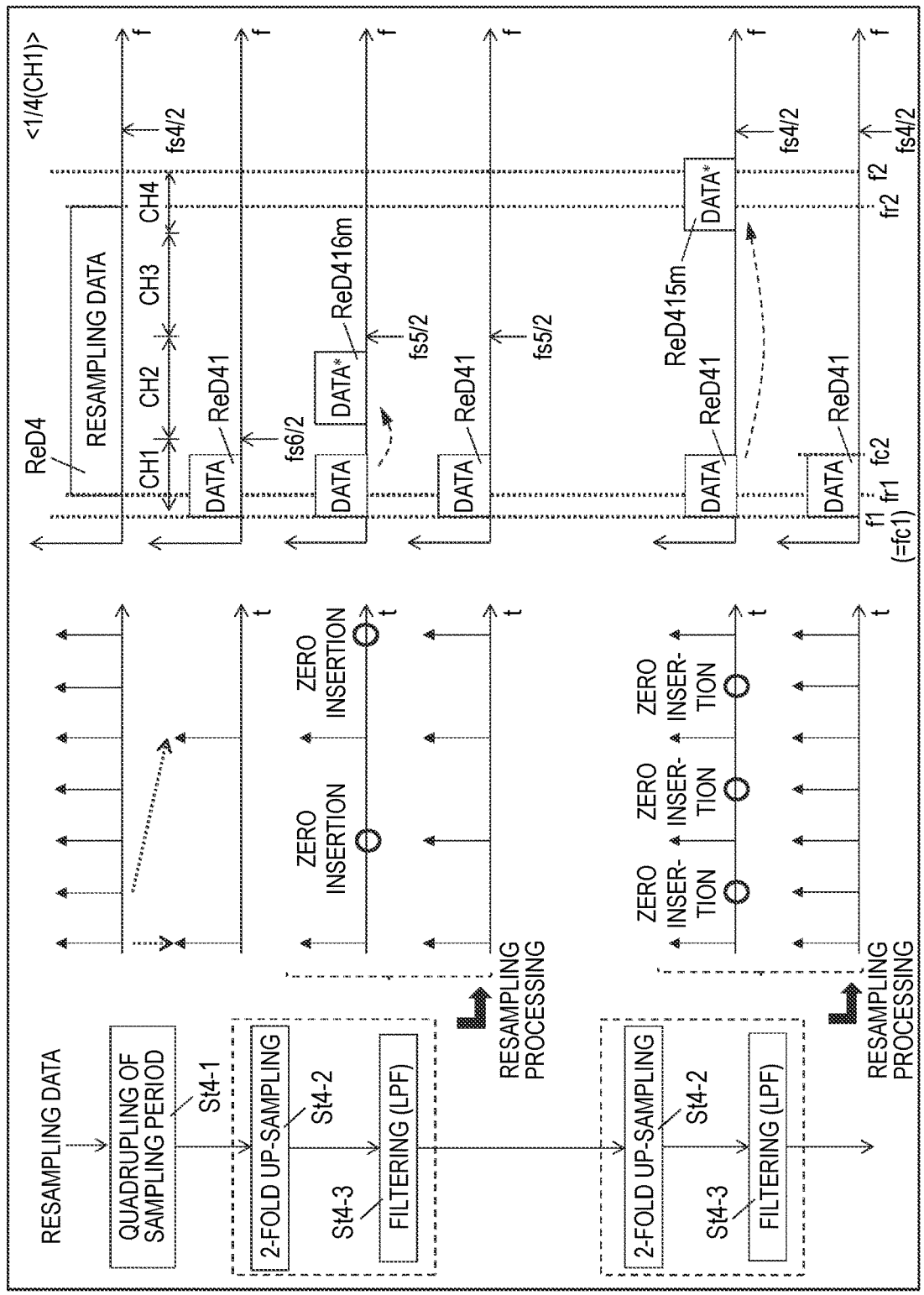
FIG. 9 is an explanatory diagram outlining an example of processing of step St4 corresponding to a case of the ¼ mode and a channel CH1.
Figure 10:
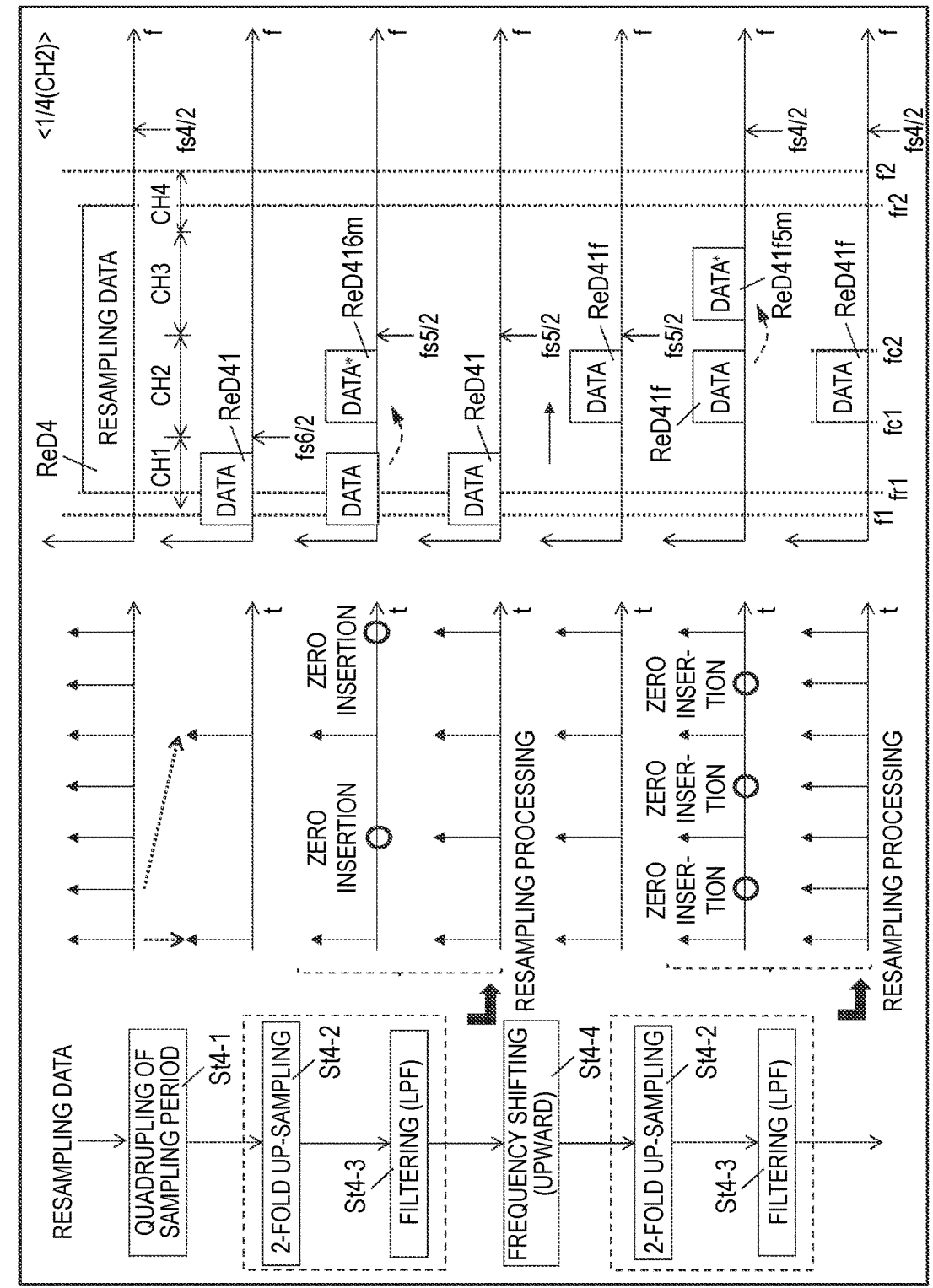
FIG. 10 is an explanatory diagram outlining an example of processing of step St4 corresponding to a case of the ¼ mode and a channel CH2.
Figure 11:
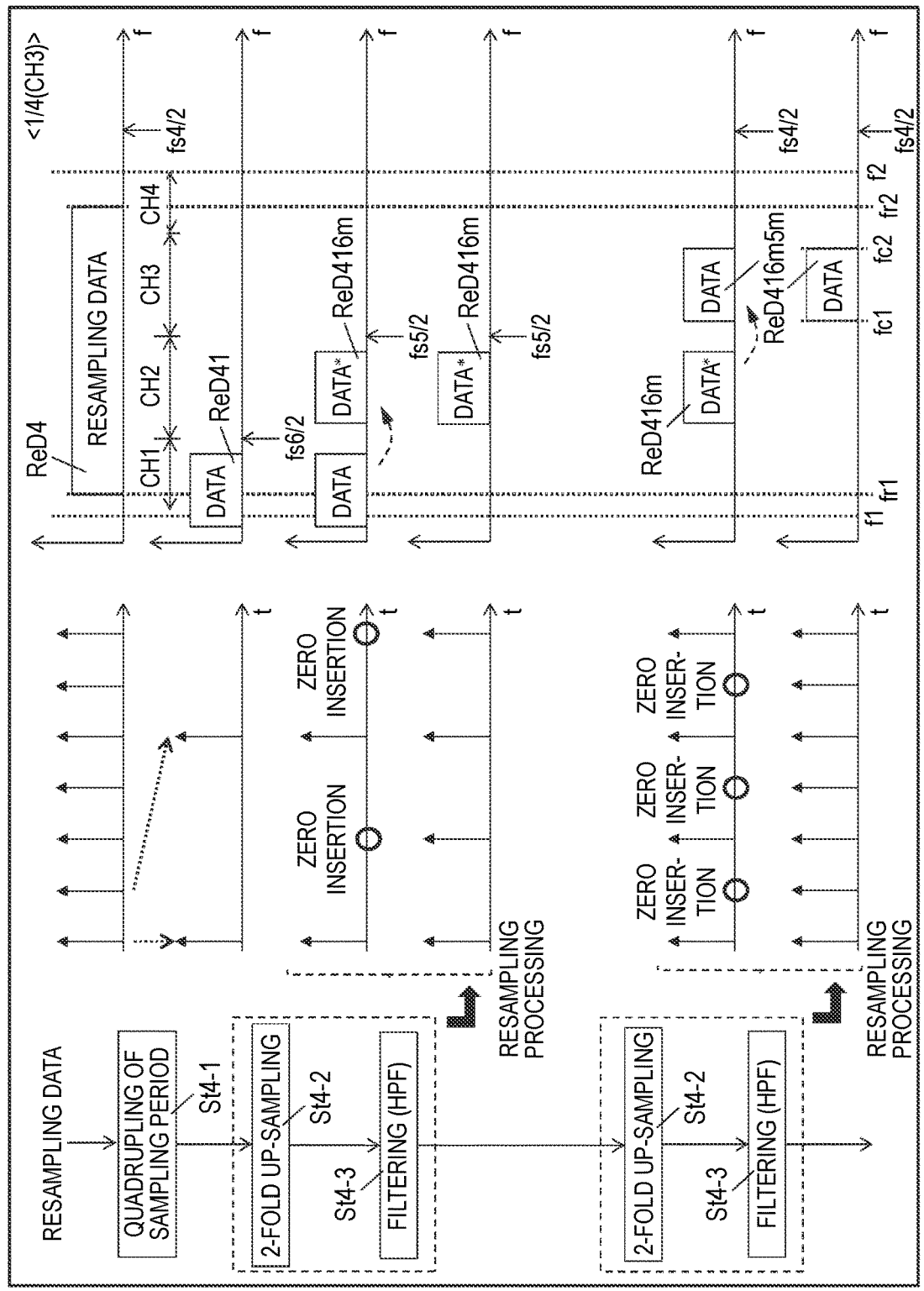
FIG. 11 is an explanatory diagram outlining an example of processing of step St4 corresponding to a case of the ¼ mode and a channel CH3.
Figure 12:
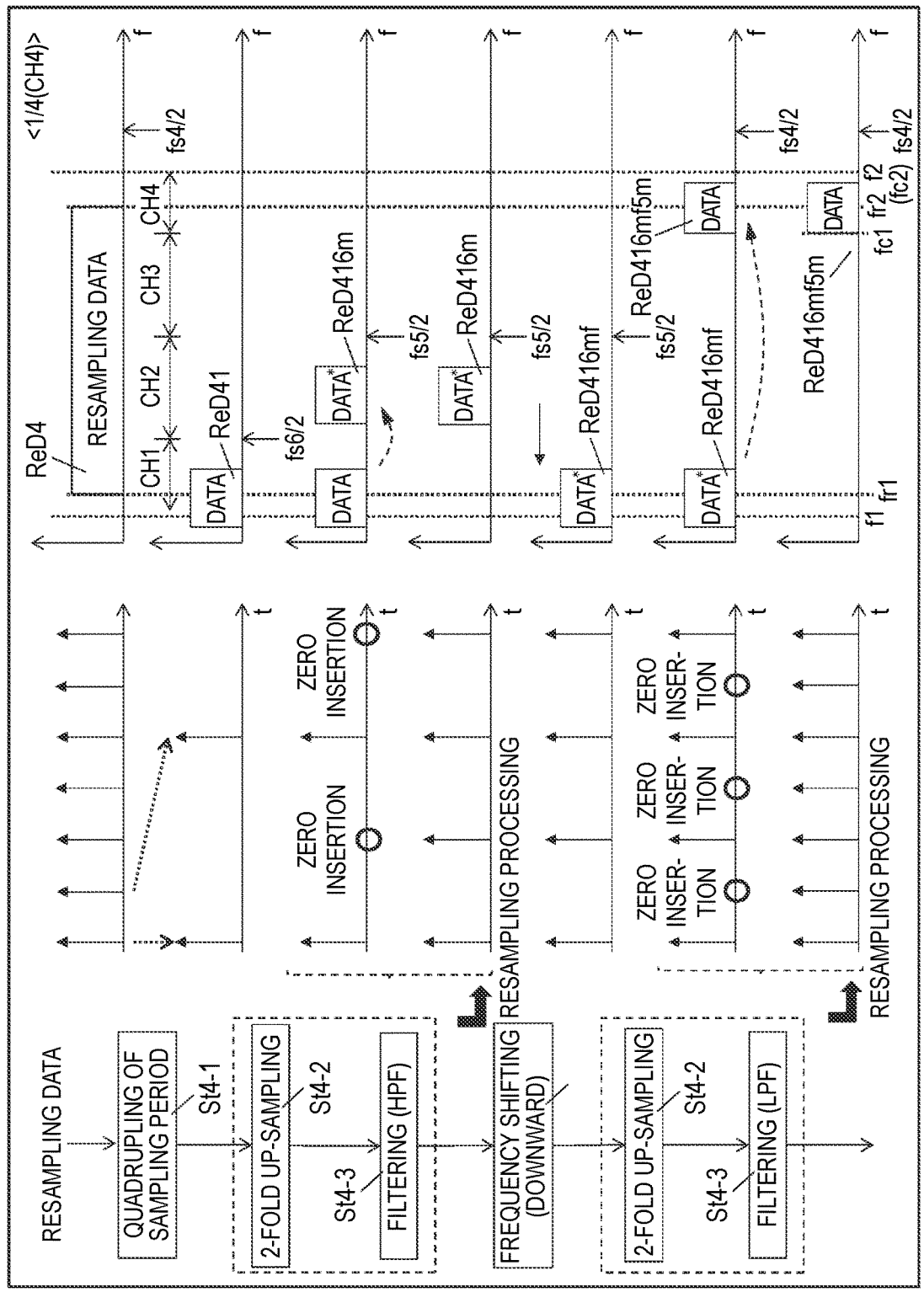
FIG. 12 is an explanatory diagram outlining an example of processing of step St4 corresponding to a case of the ¼ mode and a channel CH4.

FIG. 9 is an explanatory diagram outlining an example of processing of step St4 corresponding to the case of the ¼ mode and the channel CH1. FIG. 10 is an explanatory diagram outlining an example of processing of step St4 corresponding to the case of the ¼ mode and the channel CH2. FIG. 11 is an explanatory diagram outlining an example of processing of step St4 corresponding to the case of the ¼ mode and the channel CH3. FIG. 12 is an explanatory diagram outlining an example of processing of step St4 corresponding to the case of the ¼ mode and the channel CH4.

In FIGS. 9-12, a flowchart shown on the leftmost side on the paper surface is an extracted part of the flowchart shown in FIG. 5. Graphs showing time-axis components of four resampling data are arranged in a vertical row in the middle part on the paper surface in the same manner as in FIG. 3. Graphs showing frequency-axis components of the four resampling data are arranged in a vertical row on the rightmost side on the paper surface in the same manner as in FIG. 3. The two sets of graphs are shown for comparison.

In the example of FIG. 9, clock frequency multiplication is not done and hence the sampling frequency fs4 is equal to 62.5 MHz.

As shown in FIG. 9, when the sampling period is quadrupled (St4-1), a change is made from resampling data ReD4 in a frequency range (more specifically, fr1 (=4 MHz; see FIG. 4B) to fr2 (=f2=28 MHz)) that is lower than the Nyquist frequency (=fs4/2) to resampling data ReD41 having frequency components of f1 (=2 MHz; see FIG. 4B) to fc2 (=7 MHz; see FIG. 4B). The Nyquist frequency becomes fs6/2. The frequency fs6 (=fs4/4) is equal to 15.625 MHz. For example, the resampling data ReD41 has data corresponding to subcarrier numbers 10 to 100 (not shown).

After step St4-1, 2-fold up-sampling is performed (St4-2). For example, the PLC PHY block 11B2 performs processing of inserting Os into the resampling data ReD41. As a result, resampling data ReD416m which is a folded version of the resampling data ReD41 is generated on the opposite side (i.e., high-frequency side) of the Nyquist frequency fs6/2 to the resampling data ReD41. The Nyquist frequency becomes fs5/2. The folded resampling data ReD416m has data obtained by reversing the arrangement of the data, corresponding to the subcarrier numbers 10 to 100, of the resampling data ReD41 in the left-right direction (i.e., data corresponding to the subcarrier numbers 100 to 10).

After step St4-2, filtering processing using a lowpass filter is performed (St4-3). For example, the high-frequency-side folded resampling data ReD416m is cut away by a lowpass filter (not shown) incorporated in the PLC PHY block 11B2. As a result, resampling data ReD41 is generated that is included in the frequency band (fc1 to fc2) of the channel CH1. However, the Nyquist frequency is kept equal to fs5/2 and is not equal to the Nyquist frequency fs4/2 before the start of step St4-1.

Thus, to return the Nyquist frequency to the Nyquist frequency fs4/2 before the start of St4-1, second resampling (steps St4-2 and St4-3) is performed after step St4-3. For example, the PLC PHY block 11B2 performs processing of inserting Os into the resampling data ReD41. As a result, resampling data ReD415m which is a folded version of the resampling data ReD41 is generated on the opposite side (i.e., high-frequency side) of the Nyquist frequency fs5/2 to the resampling data ReD41. The Nyquist frequency becomes fs4/2. The folded resampling data ReD415m has data obtained by reversing the arrangement of the data, corresponding to the subcarrier numbers 10 to 100, of the resampling data ReD41 in the left-right direction (i.e., data corresponding to the subcarrier numbers 100 to 10).

After the second execution of step St4-2, second filtering processing using a lowpass filter is performed (St4-3). For example, the high-frequency-side folded resampling data ReD415m is cut away by a lowpass filter (not shown) incorporated in the PLC PHY block 11B2. As a result, resampling data ReD41 is generated that is included in the frequency band (fc1 to fc2) of the channel CH1. In this manner, by executing steps St4-1, St4-2, St4-3, St4-2, and St4-3, the PLC device 10 can generate a digital transmission signal that enables a desired power line communication that satisfies user needs because the PLC device 10 can generate resampling data suitable for the mode and the channel selected at steps St2 and St3, respectively, while satisfying the condition that it should be in a frequency band lower than the Nyquist frequency to be used for the power line communication.

In the example of FIG. 10, clock frequency multiplication is not done and hence the sampling frequency fs4 is equal to 62.5 MHz.

As shown in FIG. 10, when the sampling period is quadrupled (St4-1), a change is made from resampling data ReD4 in a frequency range (more specifically, fr1 (=4 MHz; see FIG. 4B) to fr2 (=f2=28 MHz)) that is lower than the Nyquist frequency (=fs4/2) to resampling data ReD41 having frequency components of f1 (=2 MHz; see FIG. 4B) to fc2 (=7 MHz; see FIG. 4B). The Nyquist frequency becomes fs6/2. For example, the resampling data ReD41 has data corresponding to subcarrier numbers 10 to 100 (not shown).

After step St4-1, 2-fold up-sampling is performed (St4-2). For example, the PLC PHY block 11B2 performs processing of inserting Os into the resampling data ReD41. As a result, resampling data ReD416m which is a folded version of the resampling data ReD41 is generated on the opposite side (i.e., high-frequency side) of the Nyquist frequency fs6/2 to the resampling data ReD41. The Nyquist frequency becomes fs5/2. The folded resampling data ReD416m has data obtained by reversing the arrangement of the data, corresponding to the subcarrier numbers 10 to 100, of the resampling data ReD41 in the left-right direction (i.e., data corresponding to the subcarrier numbers 100 to 10).

After step St4-2, filtering processing using a lowpass filter is performed (St4-3). For example, the high-frequency-side folded resampling data ReD416m is cut away by a lowpass filter (not shown) incorporated in the PLC PHY block 11B2. As a result, resampling data ReD41 is generated that is included in the frequency band (fc1 to fc2) of the channel CH1. However, since in the example of FIG. 10 the channel CH2 is selected, frequency shifting is performed after step St4-3. The Nyquist frequency is kept equal to fs5/2 and is not equal to the Nyquist frequency fs4/2 before the start of step St4-1.

After step St4-3, frequency shifting (frequency conversion) as described above with reference to FIG. 6 is further performed (St4-4). For example, the PLC PHY block 11B2 generates resampling data ReD41f by frequency-converting frequency components of the resampling data ReD41 to the high-frequency side so as to obtain a use frequency band fc1 to fc2 of the channel CH2 selected at step St3 by performing calculation according to Equation (1) or Equation (2) or using the table TBL2 shown in FIG. 4B.

Furthermore, to return the Nyquist frequency to the Nyquist frequency fs4/2 before the start of St4-1, second resampling (steps St4-2 and St4-3) is performed after step St4-4. For example, the PLC PHY block 11B2 performs processing of inserting Os into the resampling data ReD41f. As a result, resampling data ReD41f5m which is a folded version of the resampling data ReD41f is generated on the opposite side (i.e., high-frequency side) of the Nyquist frequency fs5/2 to the resampling data ReD41f. The Nyquist frequency becomes fs4/2. The folded resampling data ReD41f5m has data obtained by reversing the arrangement of the data, corresponding to the subcarrier numbers 10 to 100, of the resampling data ReD41 in the left-right direction (i.e., data corresponding to the subcarrier numbers 100 to 10).

After the second execution of step St4-2, second filtering processing using a lowpass filter is performed (St4-3). For example, the high-frequency-side folded resampling data ReD41f5m is cut away by a lowpass filter (not shown) incorporated in the PLC PHY block 11B2. As a result, resampling data ReD41f is generated that is included in the frequency band (fc1 to fc2) of the channel CH2. In this manner, by executing steps St4-1, St4-2, St4-3, St4-4, St4-2, and St4-3, the PLC device 10 can generate a digital transmission signal that enables a desired power line communication that satisfies user needs because the PLC device 10 can generate resampling data suitable for the mode and the channel selected at steps St2 and St3, respectively, while satisfying the condition that it should be in a frequency band lower than the Nyquist frequency to be used for the power line communication.

In the example of FIG. 11, clock frequency multiplication is not done and hence the sampling frequency fs4 is equal to 62.5 MHz.

As shown in FIG. 11, when the sampling period is quadrupled (St4-1), a change is made from resampling data ReD4 in a frequency range (more specifically, fr1 (=4 MHz; see FIG. 4B) to fr2 (=f2=28 MHz)) that is lower than the Nyquist frequency (=fs4/2) to resampling data ReD41 having frequency components of f1 (=2 MHz; see FIG. 4B) to fc2 (=7 MHz; see FIG. 4B). The Nyquist frequency becomes fs6/2. For example, the resampling data ReD41 has data corresponding to subcarrier numbers 10 to 100 (not shown).

After step St4-1, 2-fold up-sampling is performed (St4-2). For example, the PLC PHY block 11B2 performs processing of inserting 0s into the resampling data ReD41. As a result, resampling data ReD416m which is a folded version of the resampling data ReD41 is generated on the opposite side (i.e., high-frequency side) of the Nyquist frequency fs6/2 to the resampling data ReD41. The Nyquist frequency becomes fs5/2. The folded resampling data ReD416m has data obtained by reversing the arrangement of the data, corresponding to the subcarrier numbers 10 to 100, of the resampling data ReD41 in the left-right direction (i.e., data corresponding to the subcarrier numbers 100 to 10).

After step St4-2, filtering processing using a highpass filter is performed (St4-3). For example, the low-frequency-side folded resampling data ReD41 is cut away by a highpass filter (not shown) incorporated in the PLC PHY block 11B2. As a result, folded resampling data ReD416m is generated that is included in the frequency band of the channel CH2. However, transmission of a digital transmission signal including the folded resampling data ReD416m is not preferable because the arrangement of the subcarrier numbers is opposite to that of the resampling data that has been input to the main IC 11 and hence complicated reception processing needs to be performed in a reception-side PLC device 10. The Nyquist frequency is kept equal to fs5/2 and is not equal to the Nyquist frequency fs4/2 before the start of step St4-1.

Thus, to return the Nyquist frequency to the Nyquist frequency fs4/2 before the start of St4-1, second resampling (steps St4-2 and St4-3) is performed after step St4-3. For example, the PLC PHY block 11B2 performs processing of inserting 0s into the folded resampling data ReD416m. As a result, resampling data ReD416m5m which is a folded version of the folded resampling data ReD416m is generated on the opposite side (i.e., high-frequency side) of the Nyquist frequency fs5/2 to the folded resampling data ReD416m. The Nyquist frequency becomes fs4/2. The resampling data ReD416m5m has data obtained by reversing the arrangement of the data, corresponding to the subcarrier numbers 100 to 10, of the folded resampling data ReD416m in the left-right direction (i.e., data corresponding to the subcarrier numbers 10 to 100).

After the second execution of step St4-2, second filtering processing using a highpass filter is performed (St4-3). For example, the low-frequency-side folded resampling data ReD416m is cut away by a highpass filter (not shown) incorporated in the PLC PHY block 11B2. As a result, resampling data ReD416m5m is generated that is included in the frequency band (fc1 to fc2) of the channel CH3. In this manner, by executing steps St4-1, St4-2, St4-3, St4-2, and St4-3, the PLC device 10 can generate a digital transmission signal that enables a desired power line communication that satisfies user needs because the PLC device 10 can generate resampling data suitable for the mode and the channel selected at steps St2 and St3, respectively, while satisfying the condition that it should be in a frequency band lower than the Nyquist frequency to be used for the power line communication.

In the example of FIG. 12, clock frequency multiplication is not done and hence the sampling frequency fs4 is equal to 62.5 MHz.

As shown in FIG. 12, when the sampling period is quadrupled (St4-1), a change is made from resampling data ReD4 in a frequency range (more specifically, fr1 (=4 MHz; see FIG. 4B) to fr2 (=f2=28 MHz)) that is lower than the Nyquist frequency (=fs4/2) to resampling data ReD41 having frequency components of f1 (=2 MHz; see FIG. 4B) to fc2 (=7 MHz; see FIG. 4B). The Nyquist frequency becomes fs6/2. For example, the resampling data ReD41 has data corresponding to subcarrier numbers 10 to 100 (not shown).

After step St4-1, 2-fold up-sampling is performed (St4-2). For example, the PLC PHY block 11B2 performs processing of inserting 0s into the resampling data ReD41. As a result, resampling data ReD416m which is a folded version of the resampling data ReD41 is generated on the opposite side (i.e., high-frequency side) of the Nyquist frequency fs6/2 to the resampling data ReD41. The Nyquist frequency becomes fs5/2. The folded resampling data ReD416m has data obtained by reversing the arrangement of the data, corresponding to the subcarrier numbers 10 to 100, of the resampling data ReD41 in the left-right direction (i.e., data corresponding to the subcarrier numbers 100 to 10).

After step St4-2, filtering processing using a highpass filter is performed (St4-3). For example, the low-frequency-side resampling data ReD41 is cut away by a highpass filter (not shown) incorporated in the PLC PHY block 11B2. As a result, folded resampling data ReD416m is generated that is included in the frequency band of the channel CH2.

Furthermore, frequency shifting (frequency conversion) as described above with reference to FIG. 6 is performed after step St4-3 (St4-4). For example, the PLC PHY block 11B2 generates folded resampling data ReD416mf by frequency-converting frequency components of the folded resampling data ReD416m to the low-frequency side so as to obtain a use frequency band of the channel CH1 selected at step St3 by performing calculation according to Equation (1) or Equation (2) or using the table TBL2 shown in FIG. 4B.

Now, as described above, transmission of a digital transmission signal including the folded resampling data ReD416mf is not preferable because the arrangement of the subcarrier numbers is opposite to that of the resampling data that has been input to the main IC 11 and hence complicated reception processing needs to be performed in a reception-side PLC device 10. The Nyquist frequency is kept equal to fs5/2 and is not equal to the Nyquist frequency fs4/2 before the start of step St4-1.

Thus, to return the Nyquist frequency to the Nyquist frequency fs4/2 before the start of St4-1, second resampling (steps St4-2 and St4-3) is performed after step St4-4. For example, the PLC PHY block 11B2 performs processing of inserting 0s into the folded resampling data ReD416mf. As a result, resampling data ReD416mf5m which is a folded version of the folded resampling data ReD416mf is generated on the opposite side (i.e., high-frequency side) of the Nyquist frequency fs5/2 to the resampling data ReD416mf. The Nyquist frequency becomes fs4/2. The folded resampling data ReD416mf5m has data obtained by reversing the arrangement of the data, corresponding to the subcarrier numbers 100 to 10, of the folded resampling data ReD416mf in the left-right direction (i.e., data corresponding to the subcarrier numbers 10 to 100).

After the second execution of step St4-2, second filtering processing using a highpass filter is performed (St4-3). For example, the low-frequency-side folded resampling data ReD416mf is cut away by a highpass filter (not shown) incorporated in the PLC PHY block 11B2. As a result, resampling data ReD416fm5m is generated that is included in the frequency band (fc1 to fc2) of the channel CH4. In this manner, by executing steps St4-1, St4-2, St4-3, St4-4, St4-2, and St4-3, the PLC device 10 can generate a digital transmission signal that enables a desired power line communication that satisfies user needs because the PLC device 10 can generate resampling data suitable for the mode and the channel selected at steps St2 and St3, respectively, while satisfying the condition that it should be in a frequency band lower than the Nyquist frequency to be used for the power line communication. Incidentally, where the frequency band of the channel CH4 is narrow, the PLC PHY block 11B2 may widen the frequency band of the channel CH4 by narrowing the frequency band of another channel (e.g., the channel CH3 which is adjacent to the channel CH4).

Figure 13A:
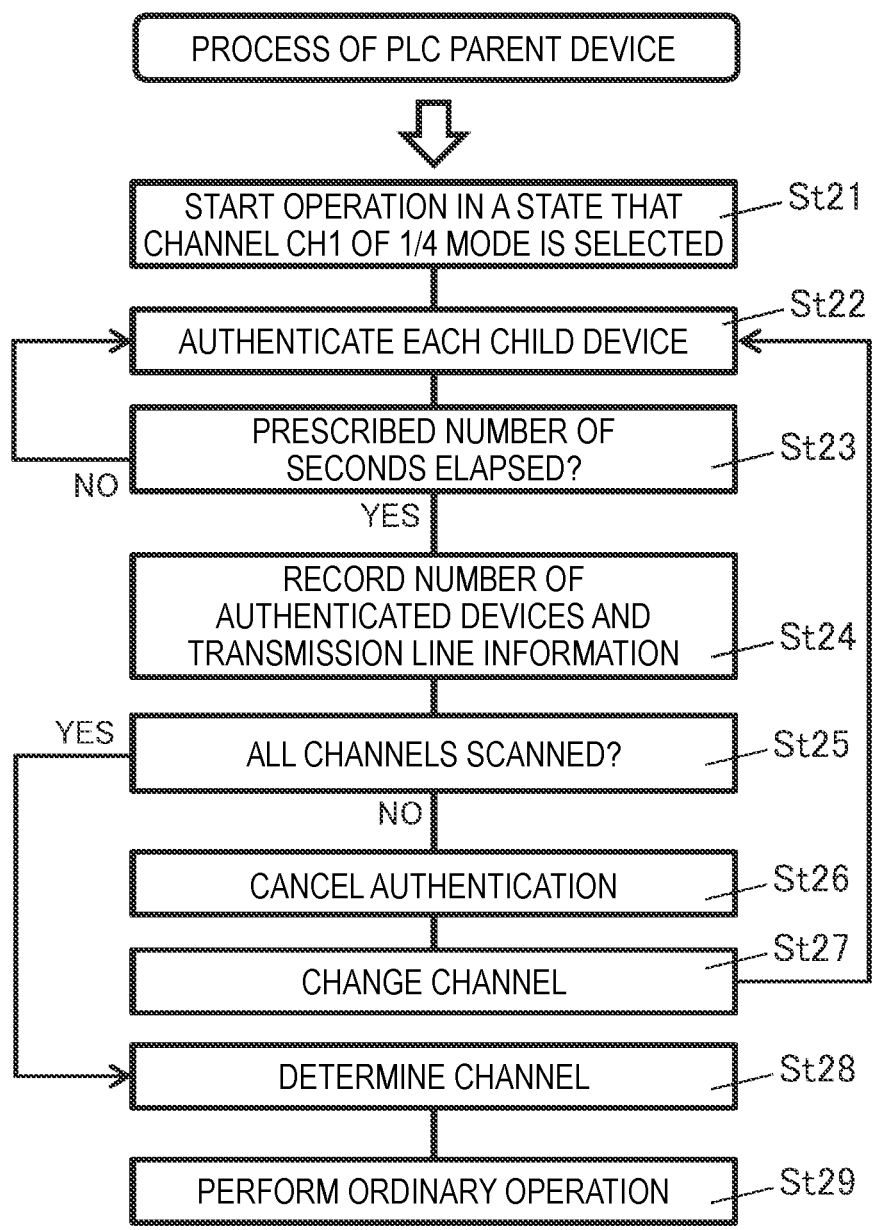
FIG. 13A is a flowchart showing a first example operation procedure relating to channel selection followed by a PLC parent device according to the first embodiment.
Figure 13B:
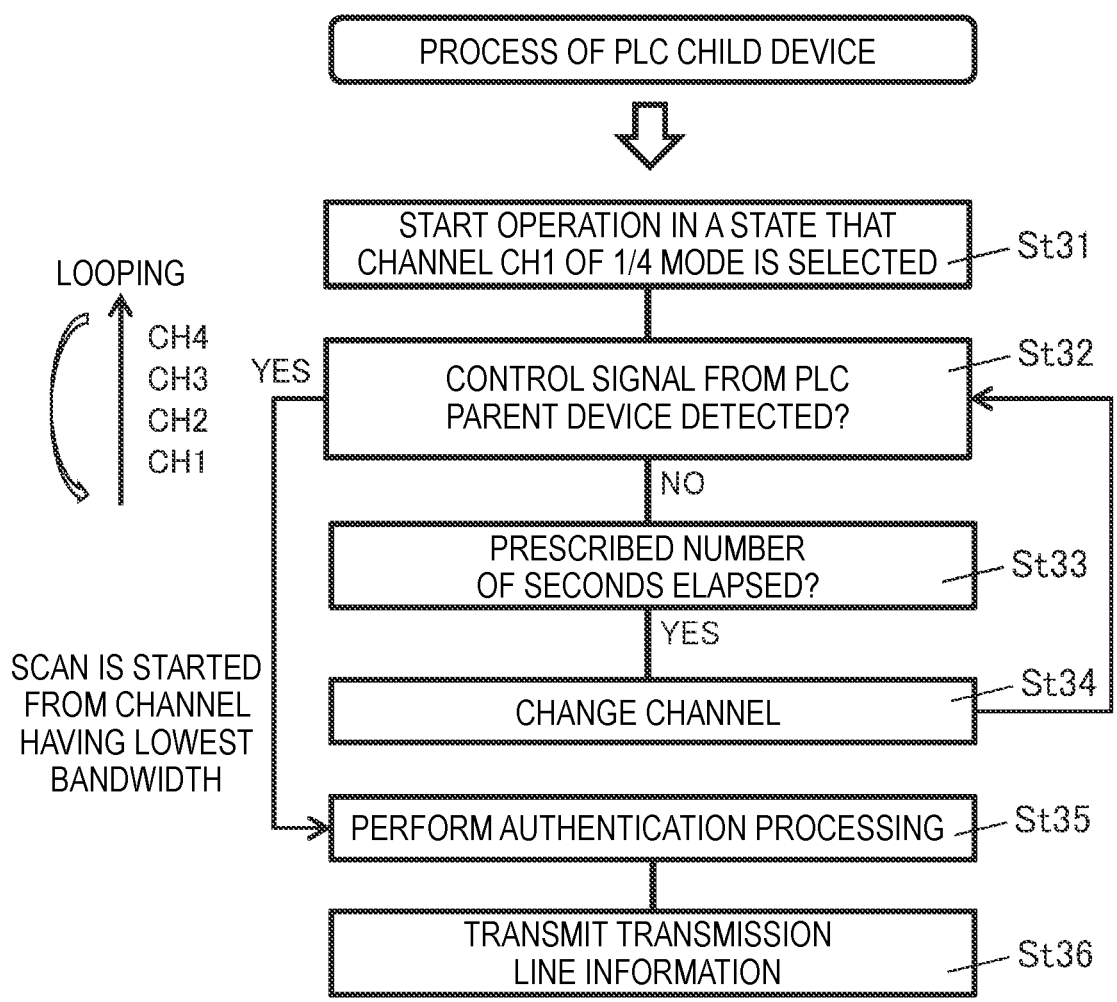
FIG. 13B is a flowchart showing a first example operation procedure relating to channel selection followed by a PLC child device according to the first embodiment.
Figure 14A:
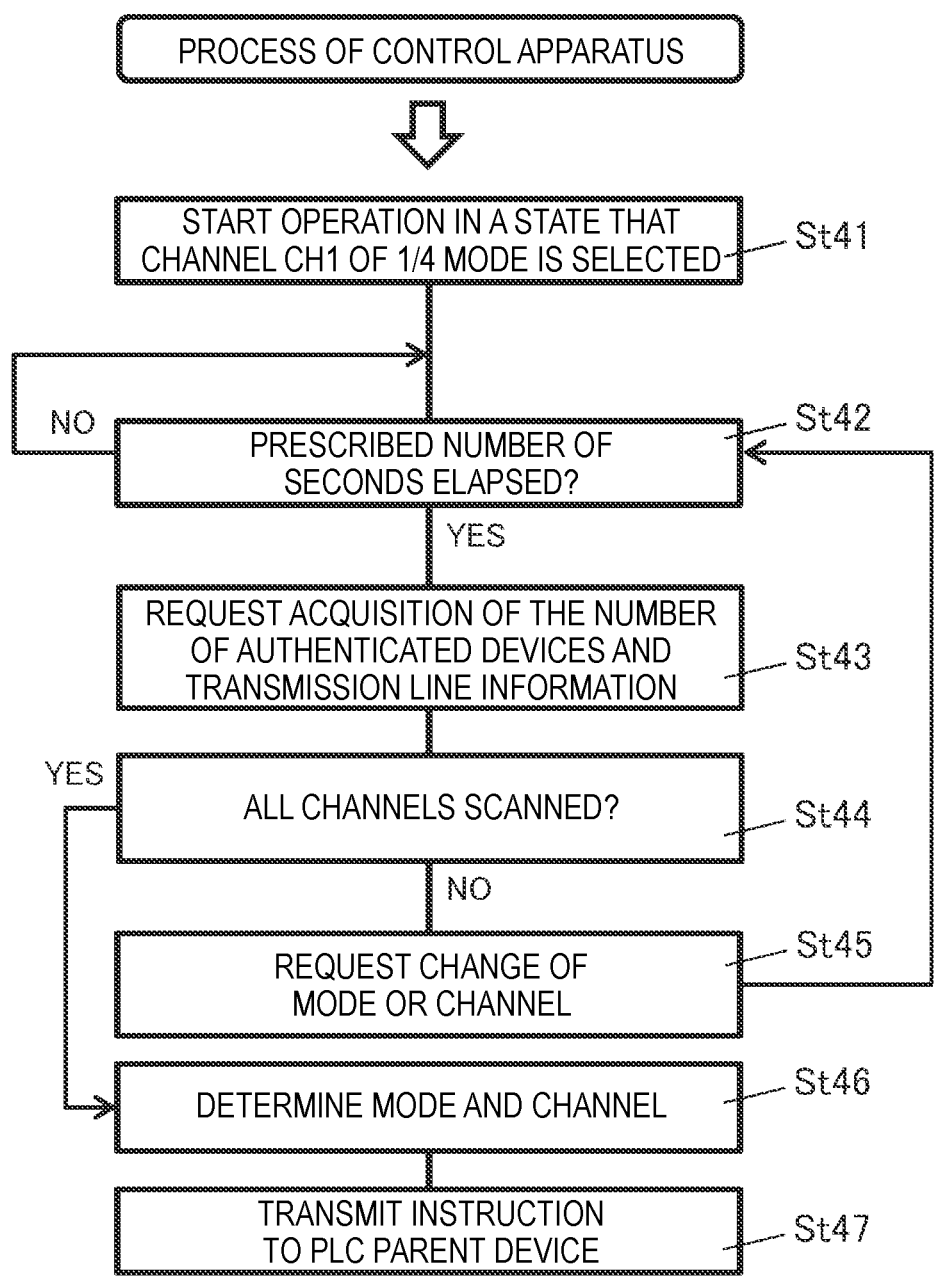
FIG. 14A is a flowchart showing an example operation procedure relating to channel selection performed by a control apparatus employed in the first embodiment.
Figure 14B:
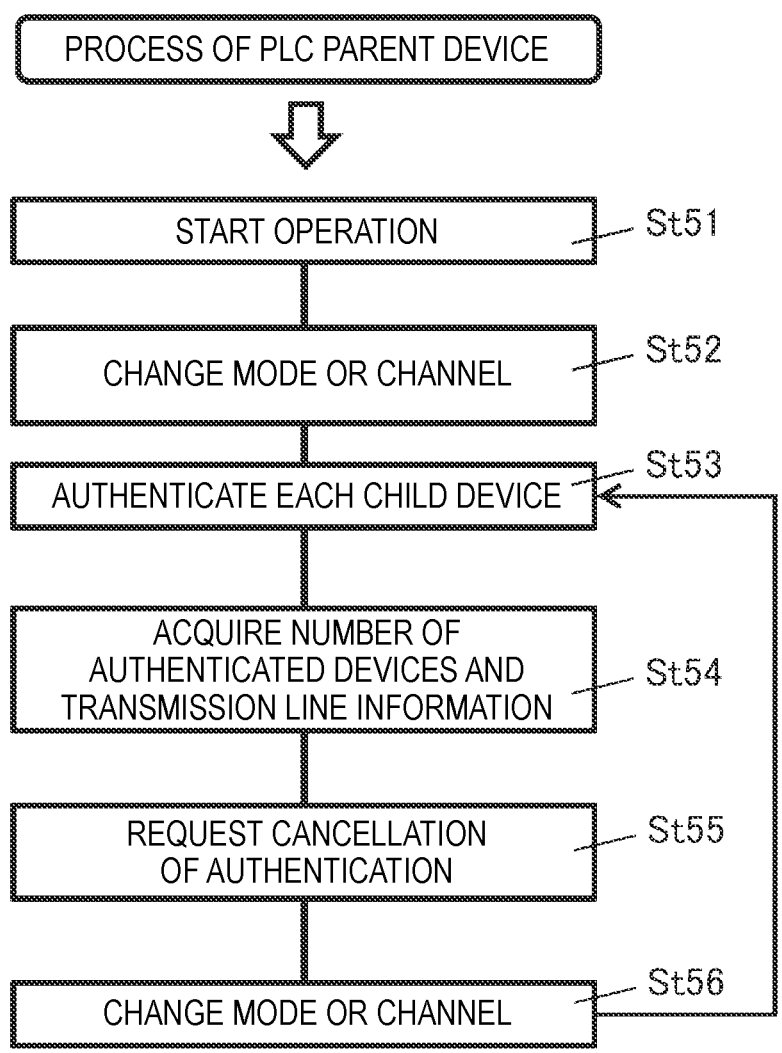
FIG. 14B is a flowchart showing a second example operation procedure relating to channel selection performed by a PLC parent device according to the first embodiment.
Figure 14C:
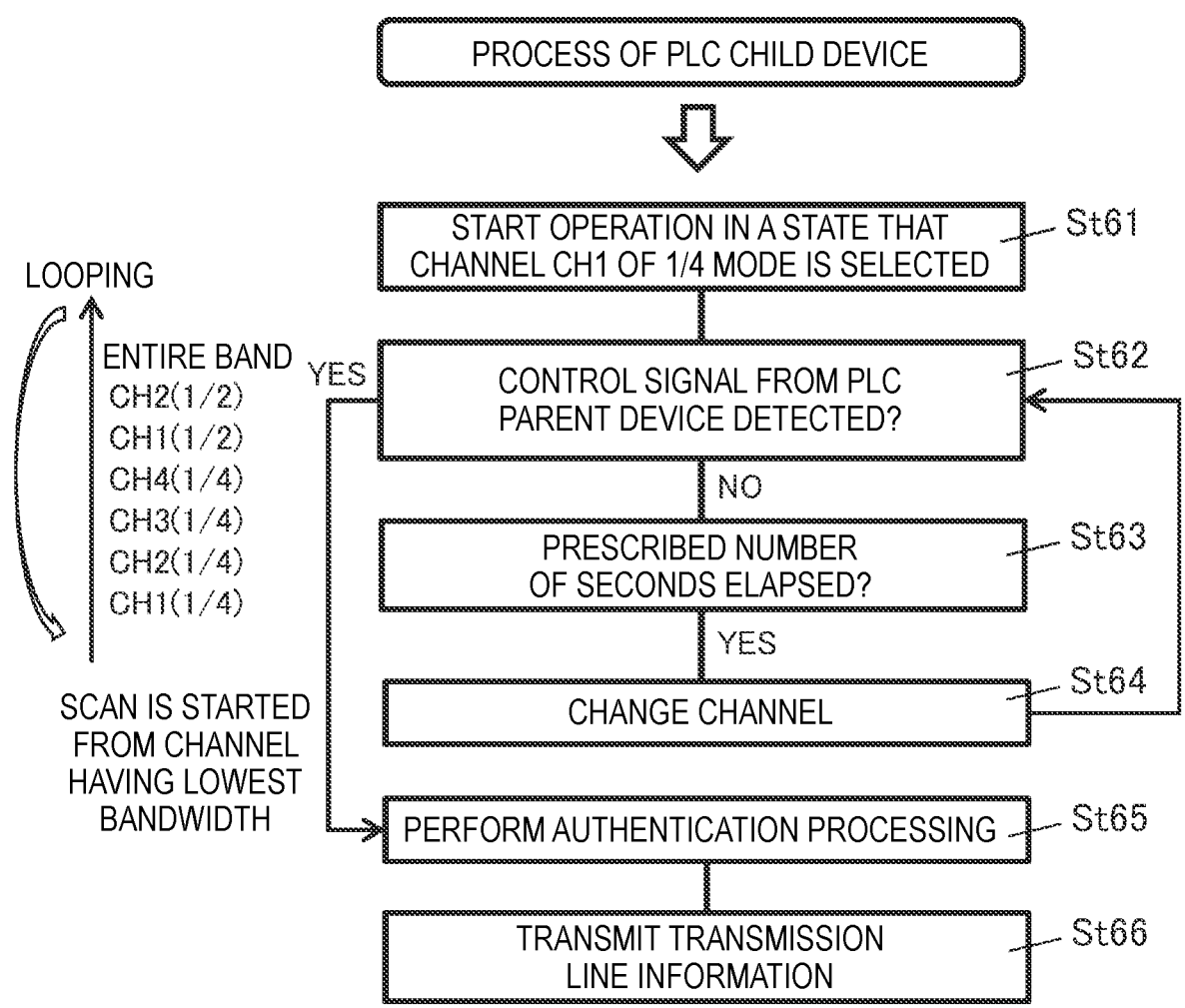
FIG. 14C is a flowchart showing a second example operation procedure relating to channel selection performed by a PLC child device according to the first embodiment.

Next, processing procedures of selection (determination) of channels to be used for a power line communication to be performed by PLC devices 10 according to the first embodiment will be described with reference to FIGS. 13A, 13B, 14A, 14B, and 14C. FIG. 13A is a flowchart showing a first example operation procedure relating to channel selection followed by a PLC parent device according to the first embodiment. FIG. 13B is a flowchart showing a first example operation procedure relating to channel selection followed by a PLC child device according to the first embodiment. FIG. 14A is a flowchart showing an example operation procedure relating to channel selection performed by the control apparatus 50 employed in the first embodiment. FIG. 14B is a flowchart showing a second example operation procedure relating to channel selection in a PLC parent device according to the first embodiment. FIG. 14C is a flowchart showing a second example operation procedure relating to channel selection in a PLC child device according to the first embodiment.

In selecting a channel to be used for a power line communication to be performed with another PLC device 10, a PLC device 10 according to the first embodiment employs one of a first pattern (see FIGS. 13A and 13B) in which a channel is selected (determined) in such a manner the two PLC devices 10 infer a bandwidth together and a second pattern (see FIGS. 14A, 14B, and 14C) in which a channel is selected (determined) using the control apparatus 50 and plural PLC devices 10.

Where one PLC device 10 according to the first embodiment and another PLC device 10 are connected to each other by the power line 1A, the attenuation characteristic becomes more conspicuous as the frequency band used for the power line communication becomes higher. On the other hand, the noise characteristic becomes more noticeable as frequency band used for the power line communication becomes lower. Furthermore, where a power line (e.g., power line 1A) is used as a wire medium of the power line communication, the state of the transmission line is varied by presence/absence of a load that generates noise, a load connected to the power line, and other factors in contrast to the case that a coaxial cable is used. Thus, where as in the conventional case only a single channel (frequency band: 2 to 28 MHz, for example) is used, there may occur an event that a good communication environment cannot be obtained being affected by the above-mentioned attenuation characteristic or noise characteristic when the state of the transmission line is varied. In view of this, the channel to be used for a power line communication should be selected adaptively according to the situation of the transmission line.

In the first pattern, a PLC parent device (e.g., PLC device 10A) according to the first embodiment acquires transmission line information obtained by a PLC child device (e.g., PLC device 10B) by observing channels while scanning them and selects (determines) a channel to be used for a power line communication on the basis of the transmission line information thus obtained. In the first pattern, a mode is selected in advance and each PLC device 10 knows information relating to the mode. In the following description, for example, transmission line information is an SNR (signal noise ratio) of a carrier corresponding to each channel and a communication rate (PHY rate) in the physical layer obtained from the SNR. The PHY rate can be calculated from the number of bits that can be transmitted per unit symbol. In the case of a multi-hop communication, it is possible to use, as the transmission line information, a link cost that is calculated to determine a multi-hop communication route.

In the second pattern, a PLC parent device (e.g., PLC device 10A) according to the first embodiment acquires transmission line information obtained by a PLC child device (e.g., PLC device 10B) by observing channels while scanning them and transmits the acquired pieces of transmission line information of the respective channels to the control apparatus 50 (see FIG. 1). The control apparatus 50 selects (determines) a channel and a mode to be used for a power line communication on the basis of the received pieces of transmission line information of the respective channels from the PLC parent device and transmits the selection result to the PLC parent device. The PLC parent device transmits the selection result received from the control apparatus 50 to the PLC child device (a case of using plural PLC child devices is included; this also applies to the following) and shares it with the PLC child device.

Assumptions of the description to be made with reference to FIG. 13A are as follows. For example, a user pushes, for a long time, prescribed buttons (not shown) provided on the bodies 100 of the PLC parent device (e.g., PLC device 10A) and the PLC child device (e.g., PLC device 10B), respectively, in a state that he or she is gripping the PLC parent device and the PLC child device, whereby a PLC child device is registered in a PLC parent device (simple connection). Instead of the simple connection, modes of the PLC parent device and the PLC child device may be selected in advance (automatic connection). In the following description, it is assumed that the ¼ mode capable of accommodating a long-distance power line communication is selected. That is, a maximum of four channels are formed (generated) in a frequency range 2 MHz to 28 MHz. The individual steps shown in FIG. 13A that will be described below are executed by the PLC MAC block 11C2, for example.

Referring to FIG. 13A, the PLC parent device (e.g., PLC device 10A) is started in a state that the channel CH1 of the ¼ mode is selected (St21). The PLC parent device (e.g., PLC device 10A) transmits a control signal (e.g., beacon signal or hallo signal) to each of PLC child devices (e.g., PLC devices 10B and 10C) and performs prescribed authentication processing (e.g., checks whether information that only both PLC devices know is held). That is, the PLC parent device (e.g., PLC device 10A) judges whether each counterpart that has returned a response signal in response to reception of the control signal is a legitimate PLC child device (St22). The PLC parent device (e.g., PLC device 10A) judges whether a prescribed number of seconds (e.g., 60 sec) has elapsed from the start of the authentication processing on the PLC child devices (St23). The authentication processing on the PLC child devices is continued (St23: no) until a lapse of the prescribed number of seconds.

On the other hand, if judging that prescribed number of seconds (e.g., 60 sec) has elapsed from the start of the authentication processing on the PLC child devices (St23: yes), the PLC parent device (e.g., PLC device 10A) acquires transmission line information (described above) of the channel CH1 transmitted from each PLC child device and the number of PLC child devices authenticated for the channel CH1 and records them in the memory 18 (St24).

The PLC parent device (e.g., PLC device 10A) judges whether a scan of all of the channels has been completed (in other words, the number of authenticated devices and transmission line information of each channel have been acquired for all of the channels CH1, CH2, CH3, and CH4 of the ¼ mode) (St25). If judging that the scan of all of the channels has not been completed yet (St25: no), the PLC parent device (e.g., PLC device 10A) cancels the authentication of the PLC child devices made at step St22 (St26) and changes the channel concerned (set channel) from the current channel (e.g., channel CH1) to another channel (e.g., channel CH2) (St27). After step St27, the PLC parent device (e.g., PLC device 10A) returns to step St22. That is, the PLC parent device (e.g., PLC device 10A) executes steps St22 to St27 repeatedly until the scan of all of the channels is completed.

If judging that the scan of all of the channels has been completed (St25: yes), the PLC parent device (e.g., PLC device 10A) determines a channel capable of realizing a good power line communication (e.g., a channel with a large number of authenticated devices, a channel that provides a highest PHY rate, or a channel that provides a lowest link cost) on the basis of the number of authenticated devices and the pieces of transmission line information of every channel and selects the determined channel (St28). The PLC parent device (e.g., PLC device 10A) transmits information relating to the channel selected at step St28 to each PLC child device to share that information, and thereafter performs a power line communication with a PLC child device as an ordinary operation (St29).

Assumptions of the description to be made with reference to FIG. 13B are as follows. A PLC child device scans channels in order starting from the channel CH1 having a lowest frequency band. After reaching the channel CH4 having a highest frequency band, the PLC child device returns to the channel CH1 having the lowest frequency band to continue the scan (looping). The individual steps shown in FIG. 13B that will be described below are executed by the PLC MAC block 11C2, for example.

Referring to FIG. 13B, started in a state that the channel CH1 of the ¼ mode is selected (St31), the PLC child device (e.g., PLC device 10B or 10C) acquires transmission line information of the channel CH1 through, for example, calculation and holds it in the memory 18.

The PLC child device (e.g., PLC device 10B or 10C) judges whether it has detected a control signal transmitted from the PLC parent device (e.g., PLC device 10A) (St32). If no control signal transmitted from the PLC parent device (e.g., PLC device 10A) has been detected (St32: no), the PLC child device (e.g., PLC device 10B or 10C) judges whether a prescribed number of seconds (e.g., 60 sec) has elapsed from the start of the PLC child device (St31) in the state that the channel CH1 was selected St31 (St33). That is, the PLC child device (e.g., PLC device 10B or 10C) stands by until a lapse of the prescribed number of seconds at step St33 or detection of a control signal transmitted from the PLC parent device (e.g., PLC device 10A).

If no control signal has been detected until a lapse of the prescribed number of seconds (St33: no), the PLC child device (e.g., PLC device 10B or 10C) changes the channel concerned (set channel) from the current channel (e.g., channel CH1) to another channel (e.g., channel CH2) (St34). After step St34, the PLC child device (e.g., PLC device 10B or 10C) returns to step St32. That is, the PLC child device judges, repeatedly, for every channel, whether it has detected a control signal transmitted from the PLC parent device (e.g., PLC device 10A) by changing the channel (in other words, use band) in units of the prescribed number of seconds (St33).

If judging that it has detected a control signal transmitted from the PLC parent device (e.g., PLC device 10A) (St32: yes), the PLC child device (e.g., PLC device 10B or 10C) performs prescribed authentication processing (e.g., checks whether information that only both PLC devices know is held) with the PLC parent device (e.g., PLC device 10A) (St35). After performing the authentication processing at step St35, the PLC child device (e.g., PLC device 10B or 10C) transmits transmission line information (described above) acquired for the current channel to the PLC parent device (e.g., PLC device 10A) (St36).

Assumptions of the description to be made with reference to FIG. 14A are as follows. Processing for registering PLC child devices (PLC devices 10B and 10C) as communication counterparts of the PLC parent device (e.g., PLC device 10A) has already been performed. Furthermore, to simplify the description, it is assumed that the initial mode to be scanned is the ¼ mode. The individual steps shown in FIG. 14A that will be described below are executed by the processor 53, for example.

Referring to FIG. 14A, the control apparatus 50 is started in a state that the channel CH1 of the ¼ mode is selected (St41). The control apparatus 50 judges whether a prescribed number of seconds (e.g., 60 sec) has elapsed from when it was started in a state that the channel CH1 of the ¼ mode was selected (St42). The control apparatus 50 stands by (St42: no) until a lapse of the prescribed number of seconds. If judging that the prescribed number of seconds has elapsed (St42: yes), the control apparatus 50 requests the PLC parent device (e.g., PLC device 10A) to acquire the number of authenticated devices and transmission line information for the channel CH1 of the ¼ mode (St43).

The control apparatus 50 judges whether a scan of all of the channels has been completed (in other words, the number of authenticated devices and transmission line information of each channel have been acquired for all of the channels CH1, CH2, CH3, and CH4 of the ¼ mode, all of the channels CH1 and CH2 of the ½ mode, and the channel CH1 of the standard mode) (St44). If judging that the scan of all of the channels has not been completed yet (St44: no), the control apparatus 50 transmits, to the PLC parent device (e.g., PLC device 10A), a request for changing the channel or the mode and the channel (St45). After step St45, the control apparatus 50 returns to step S42. That is, the control apparatus 50 executes steps St42 to St45 until completion of the scan of all of the channels.

If judging that the scan of all of the channels has been completed (St44: yes), the control apparatus 50 determines a channel capable of realizing a good power line communication (e.g., a channel with a large number of authenticated devices, a channel that provides a highest PHY rate, or a channel that provides a lowest link cost) on the basis of the number of authenticated devices and the pieces of transmission line information of every channel and selects the determined channel (St46). The control apparatus 50 generates an instruction to set information relating to the mode and the channel selected at step St46 and thereafter and transmits it to the PLC parent device (e.g., PLC device 10A) (St47).

An assumption of the description to be made with reference to FIG. 14: the individual steps shown in FIG. 14B are executed by the PLC MAC block 11C2, for example.

Referring to FIG. 14B, when receiving, from the control apparatus 50, after being started (St51), a request for changing the channel or the mode and the channel (see step St45), the PLC parent device (e.g., PLC device 10A) changes the channel concerned or the mode and channel concerned (St52). For example, the PLC parent device (e.g., PLC device 10A) changes the channel concerned to the channel CH2 of the ¼ mode.

The PLC parent device (e.g., PLC device 10A) transmits a control signal (e.g., beacon signal or hallo signal) to each of PLC child devices (e.g., PLC devices 10B and 10C) and performs prescribed authentication processing (e.g., checks whether information that only both PLC devices know is held). That is, the PLC parent device (e.g., PLC device 10A) judges whether each counterpart that has returned a response signal in response to reception of the control signal is a legitimate PLC child device (St53). If judging that the PLC child devices have been authenticated normally, the PLC parent device (e.g., PLC device 10A) acquires transmission line information (described above) of the channel CH1 transmitted from each PLC child device and the number of PLC child devices authenticated for the channel CH1 and records them in the memory 18 (St54).

The PLC parent device (e.g., PLC device 10A) transmits, to the control apparatus 50, a request for canceling the authentication of the PLC child devices for the current channel that was set at step St52 (St55). When receiving a request for changing the channel or the mode and the channel (see step St45) transmitted from the control apparatus 50, the PLC parent device (e.g., PLC device 10A) changes the channel concerned or the mode and channel concerned (St56). For example, the PLC parent device (e.g., PLC device 10A) causes a change to the channel CH2 of the ¼ mode. After step St56, the PLC parent device (e.g., PLC device 10A) returns to step St53. That is, the PLC parent device (e.g., PLC device 10A) executes steps St53 to St56 repeatedly until the scan of all of the channels is completed.

Assumptions of the description to be made with reference to FIG. 14C are as follows. A PLC child device scans channels or modes and channels in order of the channels CH1, CH2, CH3, and CH4 of the (¼ mode), the channels CH1 and CH2 of the ½ mode, and the channel CH1 of the standard mode. After reaching the standard mode, the PLC child device returns to the channel CH1 of the ¼ mode to continue the scan (looping). The individual steps shown in FIG. 14C that will be described below are executed by the PLC MAC block 11C2, for example.

Referring to FIG. 14C, started in a state that the channel CH1 of the ¼ mode is selected (St61), the PLC child device (e.g., PLC device 10B or 10C) acquires transmission line information of the channel CH1 through, for example, calculation and holds it in the memory 18.

The PLC child device (e.g., PLC device 10B or 10C) judges whether it has detected a control signal transmitted from the PLC parent device (e.g., PLC device 10A) (St62). If no control signal transmitted from the PLC parent device (e.g., PLC device 10A) has been detected (St62: no), the PLC child device (e.g., PLC device 10B or 10C) judges whether a prescribed number of seconds (e.g., 15 sec) has elapsed from the start of the PLC child device (St61) in the state that the channel CH1 was selected St61 (St63). That is, the PLC child device (e.g., PLC device 10B or 10C) stands by until a lapse of the prescribed number of seconds or detection of a control signal transmitted from the PLC parent device (e.g., PLC device 10A). The prescribed number of seconds employed here is shorter than the prescribed number of seconds (e.g., 60 sec) that the PLC parent device (e.g., PLC device 10A) counts at the above-described step St23 in authenticating the PLC child devices. This is because the PLC parent device cannot check all of the channel closely if the PLC child device switches the channel in the same cycle as the PLC parent device does. It is even preferable that the prescribed number of seconds employed in the PLC child device (i.e., the prescribed number of seconds employed at step St63) be smaller than or equal to the prescribed number of seconds employed in the PLC parent device (i.e., the prescribed number of seconds employed at step St23) divided by the number of channels. This makes it possible to secure, more certainly, a time for the PLC parent device to check all of the channel closely. For example, where the cycle employed in the PLC parent device is 60 sec and the number of channels is four, it is preferable that the cycle employed in the PLC child device be 15 sec or shorter.

If no control signal has been detected until a lapse of the prescribed number of seconds employed at step St63, the PLC child device (e.g., PLC device 10B or 10C) changes the channel concerned (set channel) from the current channel (e.g., channel CH1) to another channel (e.g., channel CH2) (St64). After step St64, the PLC child device (e.g., PLC device 10B or 10C) returns to step St62. That is, the PLC child device (e.g., PLC device 10B or 10C) judges, repeatedly, for every channel, whether it has detected a control signal transmitted from the PLC parent device (e.g., PLC device 10A) by changing the channel (in other words, use band) in units of the prescribed number of seconds employed at step St63.

If judging that it has detected a control signal transmitted from the PLC parent device (e.g., PLC device 10A) (St62: yes), the PLC child device (e.g., PLC device 10B or 10C) performs prescribed authentication processing (e.g., checks whether information that only both PLC devices know is held) with the PLC parent device (e.g., PLC device 10A) (St65). After performing the authentication processing at step St65, the PLC child device (e.g., PLC device 10B or 10C) transmits transmission line information (described above) acquired for the current channel to the PLC parent device (e.g., PLC device 10A) (St66).

As described above, in the wired communication system 1000 according to the first embodiment, a PLC device 10 selects, by means of the PLC MAC block 11C2 (an example of a term "selection unit"), a mode that prescribes the number of one or more channels prepared in a prescribed frequency band (e.g., 2 MHz to 30 MHz) and to be used for a communication to be performed with another PLC device (an example of the term "another communication device") over a wired medium (e.g., power line 1A) and a channel to be used for the communication in the mode. The PLC device 10 generates, by means of the PLC PHY block 11B (an example of a term "signal processing unit"), communication frames to be used for the communication by performing digital signal processing on input data (e.g., resampling data) that is input to the main IC according to the selected mode and channel.

With the above configuration, in contrast to a conventional power line communication that uses a usable frequency band (e.g., 2 MHz to 30 MHz) in the form of a single channel, the PLC device 10 according to the first embodiment can select, adaptively, a channel suitable for a power line communication from plural channels in the above frequency band taking into consideration such features as a noise characteristic and a signal attenuation characteristic and perform a good power line communication according to a situation of transmission line using the selected channel. As such, the PLC device 10 according to the first embodiment can perform, adaptively, a wired power line communication capable of providing desired communication characteristics being in such a level as to satisfy user demands (e.g., a long distance, a high speed, or both). Furthermore, capable of forming plural channels in the frequency band of, for example, 2 MHz to 30 MHz, the PLC device 10 can perform a good power line communication asynchronously with each of other PLC devices 10 (e.g., plural security cameras) connected to it in addition to realization of communication performance that satisfies a long distance, a high speed, or both requirements and hence can easily realize real-time surveillance or the like. Still further, capable of incorporating the main IC 11 having the PLC MAC block 11C and the PLC PHY block 11B in one chip, the PLC device 10 can perform a wired communication that can be a high-speed one and a power line communication that can be a long-distance one; the PLC device 10 can be configured in a simple manner by incorporating scalable integrated circuits (ICs).

The PLC device 10 performs the digital signal processing by sampling the input data after multiplying its sampling period and resampling input data as sampled. With this measure, since the PLC device 10 changes the Nyquist frequency by multiplying the sampling period before the resampling, the Nyquist frequency can be returned to the original one (e.g., fs4/2) to be used for a communication before the resampling even if resampling is performed: the channel can be formed easily according to a selected mode and channel.

The PLC device 10 performs the digital signal processing by further performing processing of converting a frequency band of input data as resampled into a frequency band corresponding to the selected channel. With this measure, the PLC device 10 can form the channel so that a frequency band (e.g., a high-frequency-side frequency band) of a channel selected in the frequency band (e.g., 2 MHz to 30 MHz) that can be used for a power line communication is satisfied.

The PLC device 10 performs the digital signal processing by further performing processing of resampling the converted (frequency-shifted) input data. With this measure, the PLC device 10 can form the channel so that a frequency band (e.g., a high-frequency-side or low-frequency-side frequency band) of a channel selected in the frequency band (e.g., 2 MHz to 30 MHz) that can be used for a power line communication is satisfied.

The PLC device 10 further selects a clock frequency of the self device that can be multiplied and performs the signal processing on the input data on the basis of the selected clock frequency. With this measure, the PLC device 10 can operate at a clock frequency that is higher than in the standard mode in which the clock frequency is not multiplied and hence can perform a power line communication that is adapted to a faster operation. For example, where the clock frequency is doubled, the PLC device 10 can perform a wired communication (e.g., a coaxial cable is used as the wired medium) capable of providing a throughput of about 500 Mbps in the 2-fold mode. Where the clock frequency is quadrupled, the PLC device 10 can perform a wired communication (e.g., a coaxial cable is used as the wired medium) capable of providing a throughput of about 1 Gbps in the 4-fold mode.

The PLC device 10 is further equipped with a communication unit (e.g., power connector 21) which performs a communication with the other PLC device 10 over the wired medium. The PLC device 10 receives transmission line information that is transmitted from the other PLC device 10 using each of the one or more channels; and selects a channel to be used for the communication between the self device and the other PLC device 10 on the basis of the received transmission line information of each channel. With this measure, the PLC device 10 (PLC parent device) can perform a power line communication by selecting, adaptively, a channel having a good transmission line state according to a situation (i.e., transmission line situation) of the power line 1A leading to the other PLC device 10 (PLC child device).

The PLC device 10 is further equipped with a first communication unit (e.g., power connector 21) which performs a communication with the other PLC device 10 over the wired medium and a second communication unit (e.g., modular jack 22) which performs a communication over a wired medium with the external apparatus 50 (an example of a term "external apparatus") which determines a channel to be used for the communication between the self device and the PLC device 10. The PLC device 10 receives transmission line information that is transmitted from the other PLC device 10 using each of the one or more channels, and transmits, to the external apparatus 50, the received transmission line information of each channel transmitted from the other communication device. The PLC device 10 (PLC parent device) receives, from the control apparatus 50, information relating to a channel or a mode and a channel determined by the external apparatus and to be used for the communication, and selects a channel to be used for the communication between the self device and the other PLC device 10 on the basis of the received information relating to the channel or the mode and the channel to be used for the communication. With this measure, the PLC device 10 (PLC parent device) can perform a power line communication by selecting, adaptively, a channel suitable for a situation (i.e., transmission line situation) of the power line 1A leading to the other PLC device 10 (PLC child device) on the basis of information relating to a channel or a mode and a channel determined by the control apparatus 50 without the need for making a judgment by the self device.

Although the various embodiments have been described above with reference to the accompanying drawings, it goes without saying that the disclosure is not limited to those examples. It is apparent that those skilled in the art could conceive various changes or modifications within the confines of the claims, and they are naturally construed as being included in the technical scope of the disclosure. And constituent elements of the above-described various embodiments may be combined in a desired manner without departing from the spirit and scope of the invention.

In the above-described first embodiment, the standard mode, the ½ mode, the ¼ mode, the 2-fold mode, and the 4-fold mode were described as example modes, the modes are not limited to these modes. For example, a ⅛ mode and an 8-fold mode can also be realized and, even in such a case, a PLC device 10 can form a channel so that a mode and the channel selected according to a situation of a transmission line between the self PLC device 10 and another PLC device 10 are satisfied.

The present application is based on Japanese Patent Application No. 2018-032591 filed on Feb. 26, 2018, the disclosure of which is incorporated herein by reference.

INDUSTRIAL APPLICABILITY

The present disclosure is useful when applied to communication devices and communication signal generation methods that perform, adaptively, a wired power line communication that is given desired communication characteristics being in such a level as to satisfy user demands.

DESCRIPTION OF SYMBOLS

1A: Power line
1B: Power cable
2: Receptacle
10, 10A, 10B, 10C: PLC device
11: Main IC
11A: CPU
11B1, 11B2: PLC PHY block
11C1, 11C2: PLC MAC block
12: AFE IC
12A: DA converter
12B, 12C: Variable gain amplifier
12D: AD converter
13: Lowpass filter
15: Driver IC
16: Coupler
16A: Coil transformer
16B, 16C: Coupling capacitor
17: Bandpass filter
18, 52: Memory
19: Wired PHY IC
20: Switching power source
21: Power connector
22: Modular jack
23: LED
24: AC-DC converter
25: Power plug
26: LAN cable
27: Impedance upper
27A, 27B: Coil
30: Circuit module
50: Control apparatus
51: Communication interface
53: Processor
54: Input/output interface
55: Storage
60: AC cycle detector
100: Body
1000: Wired communication system
CH1-CH4: Communication channels

The invention claimed is:

1. A communication device comprising:
a processor; and
a memory storing a program and data,
wherein the program, when executed by the processor, causes the processor to perform a process including:
selecting a mode out of a plurality of modes, which respectively define different numbers of channels in a defined frequency band used for a communication with another communication device via a wired medium;
selecting a channel in the selected mode; and
processing input data according to the selected mode and the selected channel to generate communication frames for the communication,
wherein,
the plurality of modes include a first mode defining at least one first channel and a second mode defining at least one second channel,
a frequency band of the first channel is different from a frequency band of the second channel,
a number of subcarriers in the first channel is the same as a number of subcarriers in the second channel, and
a number of the first channel(s) into which the defined frequency band is divided in the first mode is different from a number of the second channel(s) into which the defined frequency band is divided in the second mode.

2. The communication device according to claim 1, wherein the step of processing the input data includes multiplying a sampling rate of the input data and resampling the input data.

3. The communication device according to claim 2, wherein the step of processing the input data includes converting a frequency band of the input data as resampled into a frequency band corresponding to the selected channel.

4. The communication device according to claim 3, wherein the step of processing the input data includes resampling the converted input data.

5. The communication device according to according to claim 1,
wherein the step of selecting a mode includes selecting a clock frequency; and
the step of processing the input data is performed according to the selected clock frequency.

6. The communication device according to claim 1, wherein the process includes:
performing the communication with the another communication device via the wired medium;
receiving transmission line information that is transmitted from the another communication device; and
selecting a channel to be used for the communication with the another communication device based on the received transmission line information.

7. The communication device according to claim 1, wherein the process includes:
performing the communication with the another communication device via the wired medium;
receiving transmission line information transmitted from the another communication device;

transmitting, to the external apparatus, the received transmission line information and receiving, from the external apparatus, information relating to a channel determined by the external apparatus to be used for the communication between the communication device and the another communication device; and selecting the channel to be used for the communication based on the received information.

8. The communication device according to claim 1, wherein the first mode is a ½ mode defining two first channels, and the second mode is a ¼ mode defining four second channels.

9. The communication device according to claim 1, wherein the first mode is a 1 mode defining one first channel, and the second mode is a ½ mode defining two second channels.

10. The communication device according to claim 9, wherein
the plurality of modes include a third mode defining at least one third channel,
a frequency band of the third channel is different from the frequency band of the first channel and from the frequency band of the second channel,
a number of subcarriers in the third channel is the same as the number of subcarriers in the first channel and as the number of subcarriers in the second channel, and
a number of third channel(s) in the third mode is different from the number of the first channel(s) in the first mode and from the number of the second channel(s) in the second mode.

11. A communication signal generation method for a communication device, the communication signal generation method comprising:
selecting a mode out of a plurality of modes, which respectively define different numbers of channels in a defined frequency band used for a communication with another communication device via a wired medium;
selecting a channel in the selected mode; and
processing input data according to the selected mode and the selected channel to generate communication frames for the communication,
wherein,
the plurality of modes include a first mode defining at least one first channel and a second mode defining at least one second channel,
a frequency band of the first channel is different from a frequency band of the second channel,
a number of subcarriers in the first channel is the same as a number of subcarriers in the second channel, and
a number of the first channel(s) into which the defined frequency band is divided in the first mode is different from a number of the second channel(s) into which the defined frequency band is divided in the second mode.

12. The communication signal generation method according to claim 11,
wherein the first mode is a ½ mode defining two first channels, and the second mode is a ¼ mode defining four second channels.

13. The communication signal generation method according to claim 11,
wherein the first mode is a 1 mode defining one first channel, and the second mode is a ½ mode defining two second channels.

14. The communication signal generation method according to claim 11,
wherein
the plurality of modes include a third mode defining at least one third channel,
a frequency band of the third channel is different from the frequency band of the first channel and from the frequency band of the second channel,
a number of subcarriers in the third channel is the same as the number of subcarriers in the first channel and as the number of subcarriers in the second channel, and
a number of third channel(s) in the third mode is different from the number of the first channel(s) in the first mode and from the number of the second channel(s) in the second mode.

15. The communication signal generation method according to claim 11, comprising:
when a long-distance power line communication is desired, the step of selecting a mode includes selecting a ½ mode defining two channels or a ¼ mode defining four channels instead of a 1 mode defining one channel.

16. A wired communication system comprising:
a communication device comprising a processor and a memory storing a program and data, wherein the program, when executed by the processor, causes the processor to perform a process including:
selecting a mode out of a plurality of modes, which respectively define different numbers of channels in a defined frequency band used for a communication with another communication device via a wired medium;
selecting a channel in the selected mode; and
processing input data according to the selected mode and the selected channel to generate communication frames for the communication,
wherein,
the plurality of modes include a first mode defining at least one first channel and a second mode defining at least one second channel,
a frequency band of the first channel is different from a frequency band of the second channel,
a number of subcarriers in the first channel is the same as a number of subcarriers in the second channel, and
a number of the first channel(s) into which the defined frequency band is divided in the first mode is different from a number of the second channel(s) into which the defined frequency band is divided in the second mode; and
a control apparatus connected to the communication device by a communication cable.

17. The wired communication system according to claim 16,
wherein the control apparatus includes a communication interface, a memory, a processor, an input/output interface, and a storage.

18. The wired communication system according to claim 16,
wherein the first mode is a ½ mode defining two first channels, and the second mode is a ¼ mode defining four second channels.

19. The wired communication system according to claim 16,
wherein the first mode is a 1 mode defining one first channel, and the second mode is a ½ mode defining two second channels.

20. The wired communication system according to claim 16,
wherein the communication system, when a long-distance power line communication is desired, selects a mode includes selecting a ½ mode defining two channels or a ¼ mode defining four channels instead of a 1 mode defining one channel.

\* \* \* \* \*

UNITED STATES PATENT AND TRADEMARK OFFICE
CERTIFICATE OF CORRECTION

PATENT NO. : 11,184,051 B2  
APPLICATION NO. : 16/985146  
DATED : November 23, 2021  
INVENTOR(S) : Hisao Koga et al.

Page 1 of 1

It is certified that error appears in the above-identified patent and that said Letters Patent is hereby corrected as shown below:

In the Claims

Column 28, Claim 5, Lines 47-48:
"device according to according to claim 1," should read: --device according to claim 1,--.

Column 28, Claim 6, Line 57:
"information this is transmitted" should read: --information transmitted--.

Signed and Sealed this
Twenty-eighth Day of December, 2021

Drew Hirshfeld
*Performing the Functions and Duties of the
Under Secretary of Commerce for Intellectual Property and
Director of the United States Patent and Trademark Office*